United States Patent
Hosseini et al.

(10) Patent No.: US 11,974,294 B2
(45) Date of Patent: Apr. 30, 2024

(54) PREEMPTION FOR SIDELINK COMMUNICATIONS

(71) Applicant: QUALCOMM Incorporated, San Diego, CA (US)

(72) Inventors: Seyedkianoush Hosseini, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 17/313,913

(22) Filed: May 6, 2021

(65) Prior Publication Data

US 2022/0095349 A1 Mar. 24, 2022

Related U.S. Application Data

(60) Provisional application No. 63/124,609, filed on Dec. 11, 2020, provisional application No. 63/080,658, filed on Sep. 18, 2020.

(51) Int. Cl.
*H04W 72/23* (2023.01)
*H04W 72/1268* (2023.01)
*H04W 74/08* (2009.01)
*H04W 76/14* (2018.01)

(52) U.S. Cl.
CPC ....... *H04W 72/23* (2023.01); *H04W 72/1268* (2013.01); *H04W 74/0808* (2013.01); *H04W 76/14* (2018.02)

(58) Field of Classification Search
CPC ............. H04W 72/1289; H04W 72/23; H04W 72/1268; H04W 74/0808; H04W 76/14
See application file for complete search history.

(56) References Cited

U.S. PATENT DOCUMENTS

2019/0394786 A1* 12/2019 Parron ................ H04L 27/0006
2021/0058899 A1* 2/2021 Lee ........................ H04L 1/0003
(Continued)

FOREIGN PATENT DOCUMENTS

EP            3826406 A1    5/2021
WO    WO-2020017012 A1    1/2020
(Continued)

OTHER PUBLICATIONS

CAICT: "Considerations on Pre-emption Issue in RA of NR V2X Sidelink Design", 3GPP Draft, 3GPP TSG RAN WG1 Ad-Hoc Meeting 1901, R1-1901127, 3rd Generation Partnership Project (3GPP), Mobile Competence Centre, 650, Route Des Lucioles, F-06921, Sophia-Antipolis Cedex, France, vol. RAN WG1, No. Taipei, Jan. 25, 2019-Feb. 1, 2019, Jan. 20, 2019 (Jan. 20, 2019), XP051593971, 8 Pages, Retrieved from the Internet: URL: http://www.3gpp.org/ftp/Meetings%5F3GPP%5FSYNC/RAN1/Docs/R1%2D1901127%2Ezip [retrieved on Jan. 20, 2019] p. 2, Paragraph 2.2, Pre-Emption Scenarios—p. 3 p. 4, Paragraph 2.3 Pre-Emption Signalling Procedures—p. 6, p. 5 Lines 6-13 Figure 7.

(Continued)

*Primary Examiner* — Won Tae C Kim
(74) *Attorney, Agent, or Firm* — Holland & Hart LLP

(57) ABSTRACT

Methods, systems, and devices for wireless communications are described that provide for sidelink preemption. In some examples, a base station may transmit a preemption indication to instruct a user equipment (UE) to refrain from transmitting on a set of resources. In some examples, the preemption indication may be transmitted to a UE through a relay UE, which may adjust timing or resources of the preemption indication, include receipt or generation info of the preemption indication, or refrain from transmitting the preemption indication. Additionally, or alternatively, one or more sidelink UEs may infer a preemption indication from (Continued)

an uplink cancellation indication, and may refrain from performing sidelink communications based on the preemption indication.

30 Claims, 17 Drawing Sheets

(56) References Cited

U.S. PATENT DOCUMENTS

2022/0159674 A1* 5/2022 Deng ............... H04L 5/0053
2022/0394560 A1* 12/2022 Yu ............... H04W 72/0446

FOREIGN PATENT DOCUMENTS

| WO | WO-2020072708 A1 | 4/2020 |
| WO | WO-2020112534 A1 | 6/2020 |
| WO | WO-2020173536 A1 * | 9/2020 |
| WO | WO-2021035092 A1 | 2/2021 |
| WO | WO-2021146683 A1 * | 7/2021 |

OTHER PUBLICATIONS

International Search Report and Written Opinion—PCT/US2021/043403—ISA/EPO—dated Nov. 11, 2021.
NTT Docomo, et al., "NR Sidelink Resource Allocation Mechanism Mode 1", 3GPP Draft, 3GPP TSG RAN WG1 #98, R1-1909186 NR Sidelink Resource Allocation Mechanism Mode 1, 3rd Generation Partnership Project (3GPP), Mobile Competence Centre, 650, Route Des Lucioles, F-06921 SOPHIA-Antipolis Cedex, vol. RAN WG1, No. Prague, Czech Rep, Aug. 26, 2019-Aug. 30, 2019 Aug. 17, 2019 (Aug. 17, 2019), XP051765791, 7 Pages, Retrieved from the Internet: URL: http://www.3gpp.org/ftp/tsg_ran/WG1_RL1/TSGR1_98/Docs/R1-1909186.zip, [retrieved on Aug. 17, 2019] Section 2.5, 7 pgs.

\* cited by examiner

PREEMPTION FOR SIDELINK COMMUNICATIONS

CROSS REFERENCE

The present application for patent claims the benefit of U.S. Provisional Patent Application No. 63/080,658 by HOSSEINI et al., entitled "PREEMPTION FOR SIDELINK COMMUNICATIONS," filed Sep. 18, 2020, and the benefit of U.S. Provisional Patent Application No. 63/124,609 by HOSSEINI et al., entitled "PREEMPTION FOR SIDELINK COMMUNICATIONS," filed Dec. 11, 2020, each of which is assigned to the assignee hereof, and each of which is expressly incorporated by reference herein.

FIELD OF TECHNOLOGY

The following relates to wireless communications, including preemption for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support both access link and sidelink communications between devices. An access link (e.g., a Uu interface) may refer to a communication link between a network node (e.g., a base station) and a user equipment (UE). A sidelink may refer to a communication link between UEs. In some scenarios, sidelink communications may interfere with communications on one or more access links, which may result in unsuccessful transmission or reception of data packets, among other issues.

SUMMARY

The described techniques relate to improved methods, systems, devices, and apparatuses that support preemption for sidelink communications. Generally, the described techniques provide for preemption signaling to indicate to a user equipment (UE) or a group of UEs to refrain from performing sidelink communications on a set of resources. For example, a base station may transmit a preemption indication to one or more sidelink UEs indicating the UEs to refrain from transmitting on a set of resources. In some examples, the preemption indication may be transmitted to a UE through a relay node such as a relay UE or other device. Additionally, or alternatively, one or more sidelink UEs may infer a preemption indication from a control information message sent on an access link. Based on the preemption indication, a UE may determine to refrain from performing sidelink communications.

A method for wireless communications at a user equipment (UE) is described. The method may include receiving, from a base station, a sidelink preemption indication for preemption of sidelink communications for the UE, determining a set of resources for preemption of sidelink communications based on the sidelink preemption indication, and refraining from performing sidelink communications via the set of resources based on the sidelink preemption indication and the determining of the set of resources for preemption of sidelink communications.

An apparatus for wireless communications at a UE is described. The apparatus may include a processor, memory in electronic communication with the processor, and instructions stored in the memory. The instructions may be executable by the processor to cause the apparatus to receive, from a base station, a sidelink preemption indication for preemption of sidelink communications for the UE, determine a set of resources for preemption of sidelink communications based on the sidelink preemption indication, and refrain from performing sidelink communications via the set of resources based on the sidelink preemption indication and the determining of the set of resources for preemption of sidelink communications.

Another apparatus for wireless communications at a UE is described. The apparatus may include means for receiving, from a base station, a sidelink preemption indication for preemption of sidelink communications for the UE, means for determining a set of resources for preemption of sidelink communications based on the sidelink preemption indication, and means for refraining from performing sidelink communications via the set of resources based on the sidelink preemption indication and the determining of the set of resources for preemption of sidelink communications.

A non-transitory computer-readable medium storing code for wireless communications at a UE is described. The code may include instructions executable by a processor to receive, from a base station, a sidelink preemption indication for preemption of sidelink communications for the UE, determine a set of resources for preemption of sidelink communications based on the sidelink preemption indication, and refrain from performing sidelink communications via the set of resources based on the sidelink preemption indication and the determining of the set of resources for preemption of sidelink communications.

Some examples of the method, apparatuses, and non-transitory computer-readable medium described herein may further include operations, features, means, or instructions for determining that the sidelink preemption indication is for one or more remote UEs in communication with the UE, identifying a delay after receiving the sidelink preemption indication for relaying the sidelink preemption indication to the one or more remote UEs, transmitting, to the one or more remote UEs, the sidelink preemption indication in accordance with the identified delay, determining the set of resources for preemption of sidelink communications based on the sidelink preemption indication, determining a transmission timing for relaying the sidelink preemption indication to the one or more remote UEs based on the delay, and transmitting an indication of a subset of the set of resources in the sidelink preemption indication to the one or more remote UEs based on the transmission timing.

Some examples of the method, apparatuses, and non-transitory computer-readable medium described herein may further include operations, features, means, or instructions for determining that a second subset of the set of resources for preemption of sidelink communications includes stale resources based on the delay, where the subset may be non-overlapping with the second subset.

Some examples of the method, apparatuses, and non-transitory computer-readable medium described herein may further include operations, features, means, or instructions for padding a set of bits corresponding to the subset of the set of resources based on a payload size of the preemption indication.

Some examples of the method, apparatuses, and non-transitory computer-readable medium described herein may further include operations, features, means, or instructions for determining an applicability of the sidelink preemption indication for preemption of sidelink communications for the one or more remote UEs based on the delay, where the sidelink preemption indication may be transmitted based on determining the applicability of the sidelink preemption indication.

In some examples of the method, apparatuses, and non-transitory computer-readable medium described herein, identifying the delay may include operations, features, means, or instructions for determining a processing time for processing the sidelink preemption indication at the UE and determining the delay based on the processing time for processing the sidelink preemption indication at the UE.

Some examples of the method, apparatuses, and non-transitory computer-readable medium described herein may further include operations, features, means, or instructions for determining a generation time associated with generation of the sidelink preemption indication at the base station based on receiving the sidelink preemption indication and transmitting an indication of the generation time with the sidelink preemption indication.

Some examples of the method, apparatuses, and non-transitory computer-readable medium described herein may further include operations, features, means, or instructions for determining a generation time associated with generation of the sidelink preemption indication at the base station based on receiving the sidelink preemption indication, modifying the generation time associated with generation of the sidelink preemption indication based on a reception time of the sidelink preemption indication at the UE, and transmitting an indication of the modified generation time with the sidelink preemption indication.

Some examples of the method, apparatuses, and non-transitory computer-readable medium described herein may further include operations, features, means, or instructions for transmitting, in the sidelink preemption indication, an indication of a preemption periodicity associated with the sidelink preemption indication.

In some examples of the method, apparatuses, and non-transitory computer-readable medium described herein, transmitting the sidelink preemption indication may include operations, features, means, or instructions for determining a set of resources dedicated for transmission of the sidelink preemption indication and transmitting the sidelink preemption indication via the set of resources.

Some examples of the method, apparatuses, and non-transitory computer-readable medium described herein may further include operations, features, means, or instructions for receiving a configuration from the base station that indicates the set of resources dedicated for transmission of the sidelink preemption indication.

In some examples of the method, apparatuses, and non-transitory computer-readable medium described herein, determining the set of resources may include operations, features, means, or instructions for determining a beta value associated with a number of resources allocated for sidelink control information, where the sidelink preemption indication may be transmitter based on the beta value.

Some examples of the method, apparatuses, and non-transitory computer-readable medium described herein may further include operations, features, means, or instructions for receiving an indication of the beta value from the base station.

In some examples of the method, apparatuses, and non-transitory computer-readable medium described herein, transmitting the sidelink preemption indication may include operations, features, means, or instructions for performing a channel sensing procedure on a set of shared resources based on receiving the preemption indication and transmitting the sidelink preemption indication using at least a portion of the set of shared resources based on a successful channel sensing procedure.

In some examples of the method, apparatuses, and non-transitory computer-readable medium described herein, transmitting the sidelink preemption indication may include operations, features, means, or instructions for transmitting a sidelink control message that includes the sidelink preemption indication, where a format of the sidelink control message may be specific to sidelink preemption indications.

In some examples of the method, apparatuses, and non-transitory computer-readable medium described herein, transmitting the sidelink preemption indication may include operations, features, means, or instructions for transmitting a sidelink shared channel that includes the sidelink preemption indication, where the sidelink preemption indication may be indicated via a medium access control (MAC) control element (MAC-CE) of the sidelink shared channel.

A method for wireless communications at a base station is described. The method may include identifying a message scheduled over a set of time-frequency resources for communication between the base station and a UE, determining that time-frequency resources for sidelink communications at least partially overlap the set of time-frequency resources of the message between the base station and the UE, and transmitting, to a group of UEs, a sidelink preemption indication for preemption of sidelink communications based on determining that the time-frequency resources for sidelink communications at least partially overlap the set of time-frequency resources.

An apparatus for wireless communications at a base station is described. The apparatus may include a processor, memory in electronic communication with the processor, and instructions stored in the memory. The instructions may be executable by the processor to cause the apparatus to identify a message scheduled over a set of time-frequency resources for communication between the base station and a UE, determine that time-frequency resources for sidelink communications at least partially overlap the set of time-frequency resources of the message between the base station and the UE, and transmit, to a group of UEs, a sidelink preemption indication for preemption of sidelink communications based on determining that the time-frequency resources for sidelink communications at least partially overlap the set of time-frequency resources.

Another apparatus for wireless communications at a base station is described. The apparatus may include means for identifying a message scheduled over a set of time-frequency resources for communication between the base station and a UE, means for determining that time-frequency resources for sidelink communications at least partially overlap the set of time-frequency resources of the message between the base station and the UE, and means for transmitting, to a group of UEs, a sidelink preemption indication for preemption of sidelink communications based on determining that the time-frequency resources for sidelink communications at least partially overlap the set of time-frequency resources.

A non-transitory computer-readable medium storing code for wireless communications at a base station is described. The code may include instructions executable by a processor to identify a message scheduled over a set of time-frequency resources for communication between the base station and a UE, determine that time-frequency resources for sidelink communications at least partially overlap the set of time-frequency resources of the message between the base station and the UE, and transmit, to a group of UEs, a sidelink preemption indication for preemption of sidelink communications based on determining that the time-frequency resources for sidelink communications at least partially overlap the set of time-frequency resources.

In some examples of the method, apparatuses, and non-transitory computer-readable medium described herein, transmitting the sidelink preemption indication may include operations, features, means, or instructions for transmitting a control message that includes the sidelink preemption indication, where a format of the control message may be specific to sidelink preemption indications.

In some examples of the method, apparatuses, and non-transitory computer-readable medium described herein, transmitting the sidelink preemption indication may include operations, features, means, or instructions for transmitting the sidelink preemption indication based on a radio network temporary identifier specific to the sidelink preemption indication.

In some examples of the method, apparatuses, and non-transitory computer-readable medium described herein, transmitting the sidelink preemption indication may include operations, features, means, or instructions for transmitting an index corresponding to the set of time-frequency resources within the sidelink preemption indication, where the index corresponds to a serving cell supported by the base station, a resource pool index, or one or more of the group of UEs.

In some examples of the method, apparatuses, and non-transitory computer-readable medium described herein, transmitting the sidelink preemption indication may include operations, features, means, or instructions for transmitting the sidelink preemption indication to a relay UE of the group of UEs for relaying to one or more remote UEs.

Some examples of the method, apparatuses, and non-transitory computer-readable medium described herein may further include operations, features, means, or instructions for configuring a set of resources for relaying the sidelink preemption indication by the relay UE to the one or more remote UEs.

In some examples of the method, apparatuses, and non-transitory computer-readable medium described herein, transmitting the sidelink preemption indication may include operations, features, means, or instructions for transmitting an uplink cancellation indication that indicates the sidelink preemption indication using a control format for uplink cancellation indications.

In some examples of the method, apparatuses, and non-transitory computer-readable medium described herein, the uplink cancellation indication implicitly indicates the time-frequency resources that at least partially overlap the set of time-frequency resources.

Some examples of the method, apparatuses, and non-transitory computer-readable medium described herein may further include operations, features, means, or instructions for determining a timing of the sidelink message between two UEs of the group of UEs, determining a transmission time for the sidelink preemption indication based on the timing of the sidelink message and one or both of a processing time of a relay UE and a processing time of a remote UE, and transmitting the sidelink preemption indication in accordance with the transmission time.

Some examples of the method, apparatuses, and non-transitory computer-readable medium described herein may further include operations, features, means, or instructions for configuring the group of UEs for monitoring of the sidelink preemption indication according to a set of monitoring occasions and a set of search space sets separate from an uplink cancellation indication.

A method for wireless communications at a first UE is described. The method may include receiving an indication of preemption of sidelink communications for the first UE, the indication including a set of resources for sidelink preemption, determining that resources of a sidelink message scheduled for communication between the first UE and a second UE via a sidelink communications link overlap at least a portion of the set of resources for sidelink preemption based on the indication of preemption of sidelink communications, and refraining from transmitting or monitoring for the sidelink message over the at least the portion of the set of resources based on determining that resources of the sidelink message scheduled for communication between the first UE and the second UE overlap at least the portion of the set of resources for sidelink preemption.

An apparatus for wireless communications at a first UE is described. The apparatus may include a processor, memory in electronic communication with the processor, and instructions stored in the memory. The instructions may be executable by the processor to cause the apparatus to receive an indication of preemption of sidelink communications for the first UE, the indication including a set of resources for sidelink preemption, determine that resources of a sidelink message scheduled for communication between the first UE and a second UE via a sidelink communications link overlap at least a portion of the set of resources for sidelink preemption based on the indication of preemption of sidelink communications, and refrain from transmitting or monitoring for the sidelink message over the at least the portion of the set of resources based on determining that resources of the sidelink message scheduled for communication between the first UE and the second UE overlap at least the portion of the set of resources for sidelink preemption.

Another apparatus for wireless communications at a first UE is described. The apparatus may include means for receiving an indication of preemption of sidelink communications for the first UE, the indication including a set of resources for sidelink preemption, means for determining that resources of a sidelink message scheduled for communication between the first UE and a second UE via a sidelink communications link overlap at least a portion of the set of resources for sidelink preemption based on the indication of preemption of sidelink communications, and means for refraining from transmitting or monitoring for the sidelink message over the at least the portion of the set of resources based on determining that resources of the sidelink message scheduled for communication between the first UE and the second UE overlap at least the portion of the set of resources for sidelink preemption.

A non-transitory computer-readable medium storing code for wireless communications at a first UE is described. The code may include instructions executable by a processor to receive an indication of preemption of sidelink communications for the first UE, the indication including a set of resources for sidelink preemption, determine that resources of a sidelink message scheduled for communication between the first UE and a second UE via a sidelink communications link overlap at least a portion of the set of resources for sidelink preemption based on the indication of preemption of sidelink communications, and refrain from transmitting or monitoring for the sidelink message over the at least the portion of the set of resources based on determining that resources of the sidelink message scheduled for communication between the first UE and the second UE overlap at least the portion of the set of resources for sidelink preemption.

In some examples of the method, apparatuses, and non-transitory computer-readable medium described herein, receiving the indication of preemption of sidelink communications may include operations, features, means, or instructions for receiving an uplink cancellation indication for cancellation of an uplink message by the first UE, where the uplink message may be scheduled via the at least the portion of the set of resources and refraining from transmitting a sidelink message over the at least the portion of the set of resources based on the uplink cancellation indication.

Some examples of the method, apparatuses, and non-transitory computer-readable medium described herein may further include operations, features, means, or instructions for refraining from transmitting the sidelink message based on a priority of the sidelink message being below a priority level indicated by the uplink cancellation indication and transmitting a second sidelink message based on a priority of the second sidelink message being above the priority level indicated by the uplink cancellation indication.

In some examples of the method, apparatuses, and non-transitory computer-readable medium described herein, the priority level may be configured for the first UE, a given resource pool, a given carrier, a given transmission type, a given zone identifier, a given reference signal received power (RSRP), or any combination thereof.

In some examples of the method, apparatuses, and non-transitory computer-readable medium described herein, receiving the indication of preemption of sidelink communications may include operations, features, means, or instructions for receiving a sidelink preemption indication for preemption of sidelink communications for the first UE.

Some examples of the method, apparatuses, and non-transitory computer-readable medium described herein may further include operations, features, means, or instructions for identifying a generation time of the sidelink preemption indication based on the sidelink preemption indication and refraining from transmitting or monitoring for the sidelink message over the at least the portion of the set of resources based on the generation time.

In some examples of the method, apparatuses, and non-transitory computer-readable medium described herein, receiving the indication of preemption of sidelink communications may include operations, features, means, or instructions for monitoring resources dedicated for sidelink preemption indications and receiving a sidelink preemption indication based on the monitoring.

Some examples of the method, apparatuses, and non-transitory computer-readable medium described herein may further include operations, features, means, or instructions for determining that a priority level of the sidelink message may be lower than a priority level of the indication of preemption of sidelink communications and refraining from transmitting or monitoring for the sidelink message based on determining that the priority level of the sidelink message may be lower than the priority level of the indication of preemption of sidelink communications.

In some examples of the method, apparatuses, and non-transitory computer-readable medium described herein, receiving the indication of preemption of sidelink communications may include operations, features, means, or instructions for receiving a sidelink preemption indication from a base station or a relay UE in communication with the first UE.

DETAILED DESCRIPTION

Figure 1:
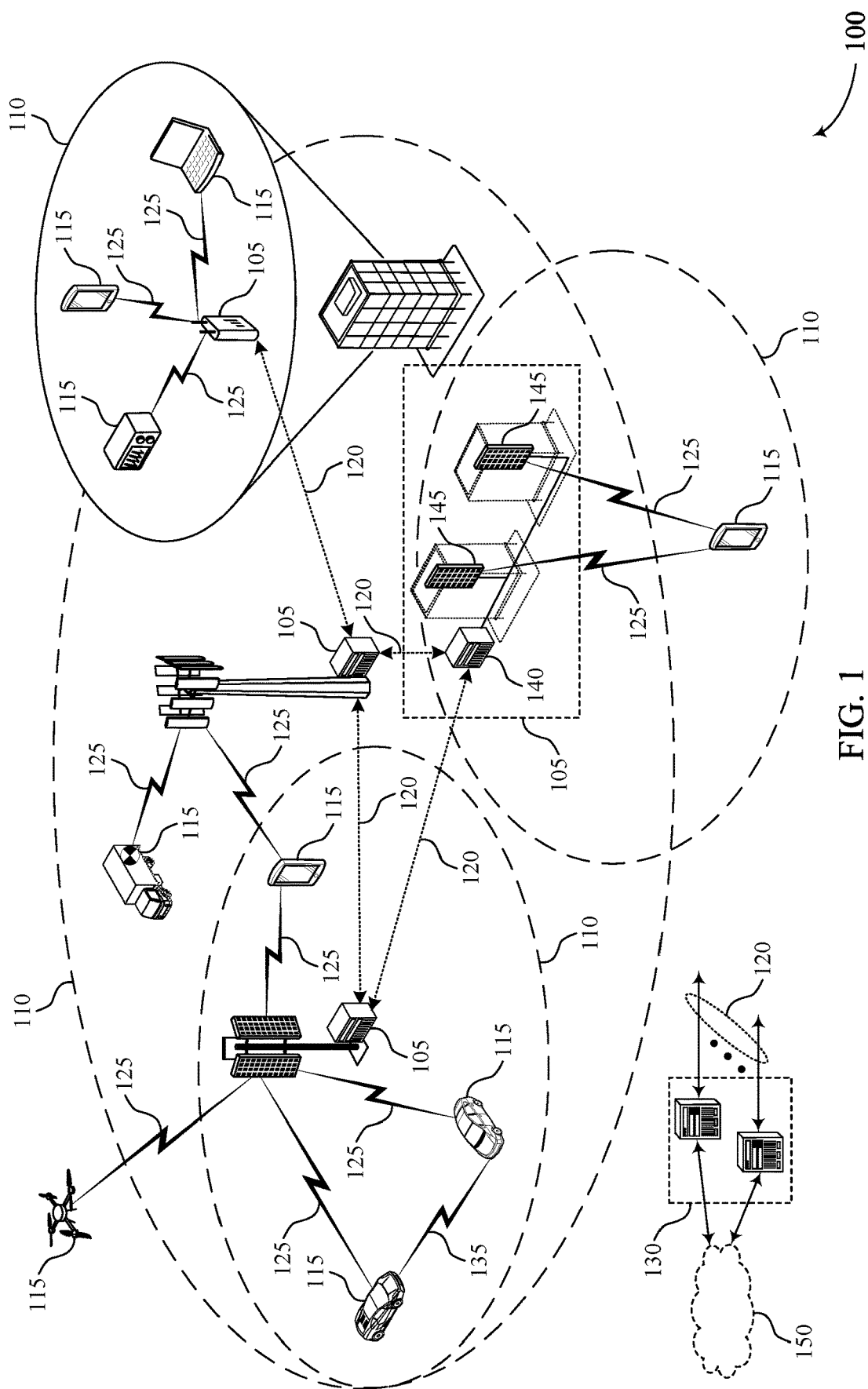
FIG. 1 illustrates an example of a wireless communications system that supports preemption for sidelink communications in accordance with aspects of the present disclosure.

Some wireless communications systems, such as fifth generation (5G) systems which may be referred to as New Radio (NR) systems, may support both access link and sidelink communications between devices. An access link (e.g., a Uu interface) may refer to a communication link between a network node (e.g., a base station) and a user equipment (UE). A sidelink may refer to a communication link between user, relay, or end devices (e.g., a communication link between UEs). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) or vehicle-to-vehicle (V2V) communications, message relaying, discovery signaling, beacon signaling, or any combination of these or other signals transmitted over-the-air from one UE to one or more other UEs.

In some examples, access link and sidelink communications may use a same frequency band (e.g., a licensed band), and sidelink communications may occur using a same set of resources as access link communications. In such cases, sidelink communications may interfere with communications on one or more access links. For example, sidelink communications between two or more UEs may cause interference with uplink or downlink communications between another UE and a base station, which may be in a coverage area associated with the access link. Additionally, or alternatively, some sidelink communications may occur outside of a coverage area associated with the access links (i.e., if a UE using an access link is near a boundary of the coverage area). Such interference may lead to unreliable communications on access links.

To mitigate or reduce interference, a wireless communications system may use preemption signaling to instruct one or more UEs to refrain from performing sidelink communications on a set of resources. In some examples, a base station may transmit a preemption indication to one or more sidelink UEs indicating the UEs to refrain from transmitting or receiving on the set of resources. In some implementations, the base station may transmit control signaling (e.g., a downlink control information (DCI) message) that includes the preemption indication. In some examples, the preemption indication may include an index associated with one or more of a serving cell, a resource pool, or a UE, and a UE receiving the preemption indication may determine a set of resources to preempt based on the index.

In some examples, the preemption indication may be transmitted to a UE via a relay UE. For example, a base station may transmit the preemption indication to a relay UE operating within a coverage area supported by the base station. The relay UE may transmit the preemption indication to a UE operating outside of the coverage area. In some examples, the relay UE may transmit the preemption indication via a physical sidelink shared channel (PSSCH) or via a physical sidelink control channel (PSCCH) using control signaling (e.g., a sidelink control information 1 (SCI1) or sidelink control information 2 (SCI2) message, a medium access control (MAC) control element (MAC-CE), etc.). In some examples, the relay UE may transmit the preemption indication using a configured set of resources or a set of preconfigured resources (e.g., resources allocated for preemption indications). In some examples, such as if operating via a second resource allocation (e.g., Mode 2 resource allocation), the relay UE may transmit, aperiodically or periodically, the preemption indication based on channel sensing and resource reservation techniques for communicating with a remote UE.

In some implementations, the relay UE may adjust the preemption indication based on a transmission time. For example, the relay UE may receive a preemption indication indicating a set of resources for preemption. The relay UE may determine that a first subset of the set of resources may no longer be applicable for a remote UE or end device UE due to the processing time at the relay UE for relaying communications, the time used for channel sensing and accessing or reserving resources of the channel, a transmission time associated with the preemption indication, or any combination thereof. Accordingly, the relay UE may transmit an adjusted preemption indication including a portion of the set of resources for the remote UE to preempt. Additionally, or alternatively, the relay UE may transmit an indication of a time (e.g., a time, a slot index, a direct frame number, etc.) associated with the preemption indication (e.g., a time at which the preemption indication was received at the relay UE, a time at which the preemption indication was generated, etc.). After receiving the preemption indication from the relay UE, the remote UE may determine a set of resources to preempt based on the indicated time. Alternatively, the relay UE may transmit the preemption indication only if the indication includes resources that may be capable of preemption at the remote UE. That is, the relay UE may determine whether the resources indicated in the preemption indication may still be capable of preemption by the remote UE based on the timing associated with the resources, latency that may be introduced for relaying the preemption indication, or a combination thereof.

In some examples, one or more sidelink UEs may infer a preemption indication from an uplink control information message sent by a UE on an access link. For example, a UE may determine that a set of resources overlap with a set of sidelink resources and may determine to preempt the resources in response. In some examples, a UE may refrain from performing communications that a have a priority below a priority threshold but perform sidelink communications that have a priority above the threshold. In some implementations, the priority threshold may be configured for a UE, a resource pool, a carrier, a cast type, a zone identification, a reference signal received power, or any combination thereof.

Particular aspects of the subject matter described herein may be implemented to realize one or more of the following potential advantages. The techniques employed by the described wireless communications systems may provide benefits and enhancements to the operation of the wireless communications system. For example, the described techniques may include features improving a reliability of communications by mitigating or reducing interference between access links and sidelinks using sidelink preemption signaling. The described techniques include additional features for improving resource use, power consumption, battery life, and throughput, among other benefits.

Aspects of the disclosure are initially described in the context of wireless communications systems. Aspects of the disclosure are further illustrated by and described with reference to a timing diagram and process flows. Aspects of the disclosure are further illustrated by and described with reference to apparatus diagrams, system diagrams, and flowcharts that relate to preemption for sidelink communications.

FIG. 1 illustrates an example of a wireless communications system 100 that supports preemption for sidelink communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a D2D communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, V2V communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a wireless communications system 100 may support both access link and sidelink communications between devices. For example, a base station 105 may communicate with a UE 115 over an access link (e.g., a Uu interface). Similarly, a UE 115 may communicate with another UE 115 via a sidelink. In some examples, access link and sidelink communications may use a same frequency band. In such examples, sidelink communications between UEs 115 may interfere with access link communications between UEs 115 and a base station 105.

According to some aspects, the wireless communications system 100 may implement sidelink preemption techniques. For example, a sidelink preemption technique may involve a base station 105 transmitting an indication of one or more resources to a UE 115 and instructions to refrain from communicating on the indicated resources. A UE 115 may determine to refrain from performing sidelink communications on the resources based on receiving the indication. In some examples, the UE 115 may operate within a coverage area 110 associated with the base station 105 and may communicate with another UE 115 that is outside of the coverage area 110 using a sidelink. In such examples, the UE 115 may act as a relay device and transmit the preemption indication to the UE 115 that is outside of the coverage area 110. Accordingly, the UE 115 outside of the coverage area 110 may refrain from performing sidelink communications. In some examples, a UE 115 may receive an uplink cancellation indication from a base station 105 and refrain from communicating on a sidelink based on the received uplink cancellation indication.

Figure 2:
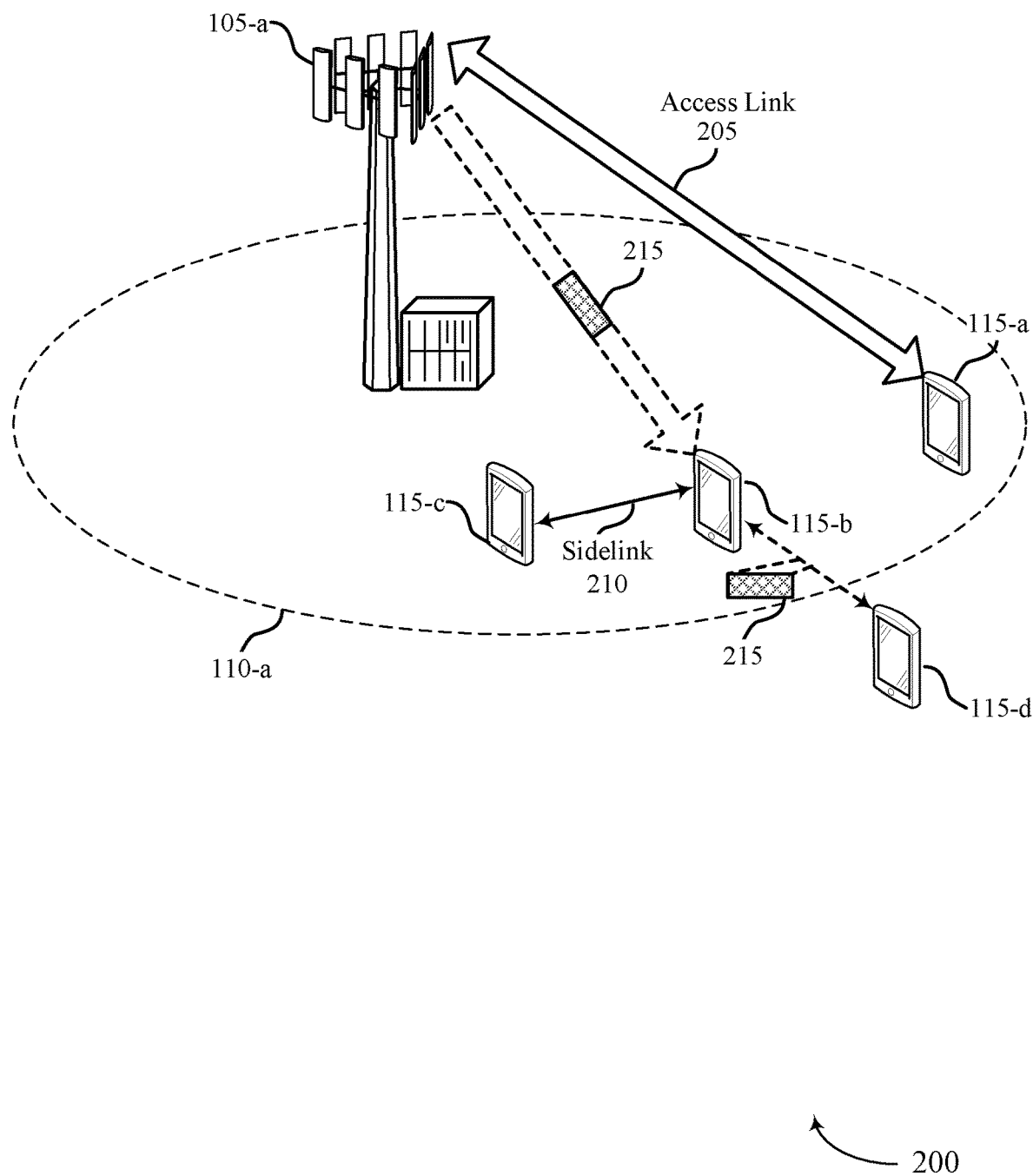
FIG. 2 illustrates an example of a wireless communications system that supports preemption for sidelink communications in accordance with aspects of the present disclosure.

FIG. 2 illustrates an example of a wireless communications system 200 that supports preemption for sidelink communications, in accordance with one or more aspects of the present disclosure. In some examples, the wireless communications system 200 may implement one or more aspects of a wireless communications system 100 as described with reference to FIG. 1. The wireless communications system 200 may include a UE 115-*a*, a UE 115-*b*, a UE 115-*c*, and a UE 115-*d* which may be examples of a UE 115 as described with reference to FIG. 1. The wireless communications system 200 may also include a base station 105-*a* which may be an example of a base station 105 as described with reference to FIG. 1. The base station 105-*a* may be associated with a cell that provides wireless communications service within a coverage area 110-*a*.

In some examples, the base station 105-*a* may communicate with the UE 115-*a* via an access link 205 which may be an example of a Uu interface. In some examples, one or more of the UE 115-*a*, the UE 115-*b*, the UE 115-*c*, or the UE 115-*d* may communicate via a sidelink. For example, the UE 115-*b* may communicate with the UE 115-*c* over a sidelink 210. Similarly, the UE 115-*b* may communicate with the UE 115-*d* over a sidelink. It is noted that UEs 115 operating using a sidelink may be in or out of the coverage area 110-*a*. Further, UEs 115 operating using a sidelink may use a Mode 1 resource allocation or a Mode 2 resource allocation.

In some examples, a UE 115 may operate using both an access link and a sidelink. For example, the UE 115-*b* may perform sidelink communications with the UE 115-*c* and receive information via an access link from the base station 105-*a*. In some examples, sidelink communications via one or more of the UE 115-*a*, the UE 115-*b*, the UE 115-*c*, or the UE 115-*d* may interfere with access link communications with the base station 105-*a*. To help mitigate or reduce interference, the wireless communications system 200 may implement sidelink preemption techniques to manage resources shared by access link and sidelink communications.

In some examples, sidelink preemption may include the base station 105-*a* identifying a set of time-frequency resources scheduled for communication between the base station 105-*a* and the UE 115-*a*. The base station 105-*a* may determine that the set of time-frequency resources at least partially overlap time-frequency resources for sidelink communications between one or more of the UE 115-*a*, the UE 115-*b*, the UE 115-*c*, or the UE 115-*d*. For example, the base station 105-*a* may determine that the set of time-frequency resources overlap time-frequency resources for sidelink communications between the UE 115-*b* and the UE 115-*c*. The base station 105-*a* may transmit a sidelink preemption indication 215 to the UE 115-*b*, the UE 115-*c*, or both indicating the overlapping set of time-frequency resources. In some examples, the preemption indication 215 may be associated with a priority, a channel condition (e.g., a reference signal received power (RSRP)), zone identification, a periodicity of preemption, a resource pool identification, a cast type, or any combination thereof. In some examples, the preemption indication 215 may be specific to a resource pool or to a set of resource pools. Similarly, the preemption indication 215 may be specific to a serving cell or to a set of serving cells. The sidelink preemption indication 215 may include an index associated with one or more of a serving cell, a resource pool, or a UE 115 such that, upon receiving the sidelink preemption indication 215, a UE 115 may determine a number of bits associated with the preempted set of resources based on the index.

In some examples, the base station 105-a may include the sidelink preemption indication 215 in a DCI message configured for uplink cancellation indication (e.g., DCI format 2_4). In some examples, the base station 105-a may include the sidelink preemption indication 215 in a DCI message configured for preemption indications or sidelink preemption indications. In some examples, the base station 105-a may send the sidelink preemption indication 215 using a radio network temporary identifier (RNTI) associated with sidelink preemption and may transmit the sidelink preemption indication 215 using a dedicated set of resources (e.g., periodically or aperiodically). In some examples, the base station 105-a may configure one or more of the UE 115-b, the UE 115-c, or the UE 115-d for monitoring of the preemption indication 215 according to a set of monitoring occasions and a set of search space sets that may be separate from an uplink cancellation indication.

In response to receiving the sidelink preemption indication 215, the UE 115-b or the UE 115-c may refrain from communication using the indicated set of resources. For example, the UE 115-b may refrain from transmitting using the indicated set of resources and the UE 115-b may refrain from monitoring (e.g., for a PSSCH or PSCCH) or decoding the indicated set of resources. It is noted that either the UE 115-b or the UE 115-c may act as a transmitting or receiving device and that any number of UEs 115 may be included in the sidelink preemption indication.

In some examples, if a UE 115 outside of the coverage area 110-a causes interference, the sidelink preemption indication 215 may be relayed through a UE 115 that is operating within the coverage area 110-a. For example, the UE 115-b may be within the coverage area 110-a and may communicate with the UE 115-d, which is outside of the coverage area 110, via a sidelink. Accordingly, the UE 115-b may receive the sidelink preemption indication 215 (e.g., from the base station 105-a) and may relay the sidelink preemption indication 215 to the UE 115-d. In some examples, the UE 115-b may relay the sidelink preemption indication 215 via control information (e.g., SCI1, an SCI2 configured for sidelink preemption, or a MAC CE) transmitted on a PSCCH. In some examples, the UE 115-b may relay the sidelink preemption indication 215 using a dedicated set of resources configured for sidelink preemption. In some examples, the UE 115-b may relay the sidelink preemption indication 215 based on sensing and resource reservation (i.e., when operating using Mode 2 resource allocation). In response to receiving the sidelink preemption indication 215, the UE 115-d may refrain from using (e.g., refrains from transmitting or receiving) the indicated set of resources.

In some examples, the sidelink preemption technique may include a UE 115 inferring sidelink preemption using an uplink cancellation indication. For example, the UE 115-b may receive an uplink cancellation indication from the base station 105-a indicating a set of resources (a set of symbols, resource blocks, etc.) for uplink cancellation. Based on the uplink cancellation indication, the UE 115-b may determine to preempt sidelink communications that utilize the same or a partially overlapping set of resources. In some cases, a UE 115-c may receive the sidelink preemption indication 215 from the base station 105-a (e.g., in unicast), and may determine that the sidelink preemption indication 215 is associated with UE 115-b such that UE 115-b may refrain from transmitting to the UE 115-c via sidelink 210. In such cases, the UE 115-c may refrain from monitoring or decoding the set of resources indicated by the sidelink preemption indication 215, which may allow the UE 115-c to conserve power.

In some examples, the UE 115-b may be configured to cancel all sidelink communications regardless of priority. In some examples, the UE 115-b may be configured to preempt sidelink communications with a priority below a threshold and perform sidelink communications with a priority above the threshold. In some implementations, the priority threshold may be configured per resource pool, per carrier, per cast type, per UE 115, or any combination thereof. In some cases, a resource pool may be configured or dedicated for relaying of a sidelink preemption indication 215, and one or more UEs 115 may monitor the resource pool for sidelink preemption indications. For instance, the one or more UEs 115 may be configured to periodically or aperiodically monitor the resource pool to decode the sidelink preemption indication 215. Alternatively, the sidelink preemption indication 215 may be sent based on channel sensing or resource reservation techniques (e.g., using SCI1 or SCI2 for reserving resources), which may delay the relaying of the sidelink preemption indication 215 if a channel is busy when a relay performs channel sensing.

Figure 3:
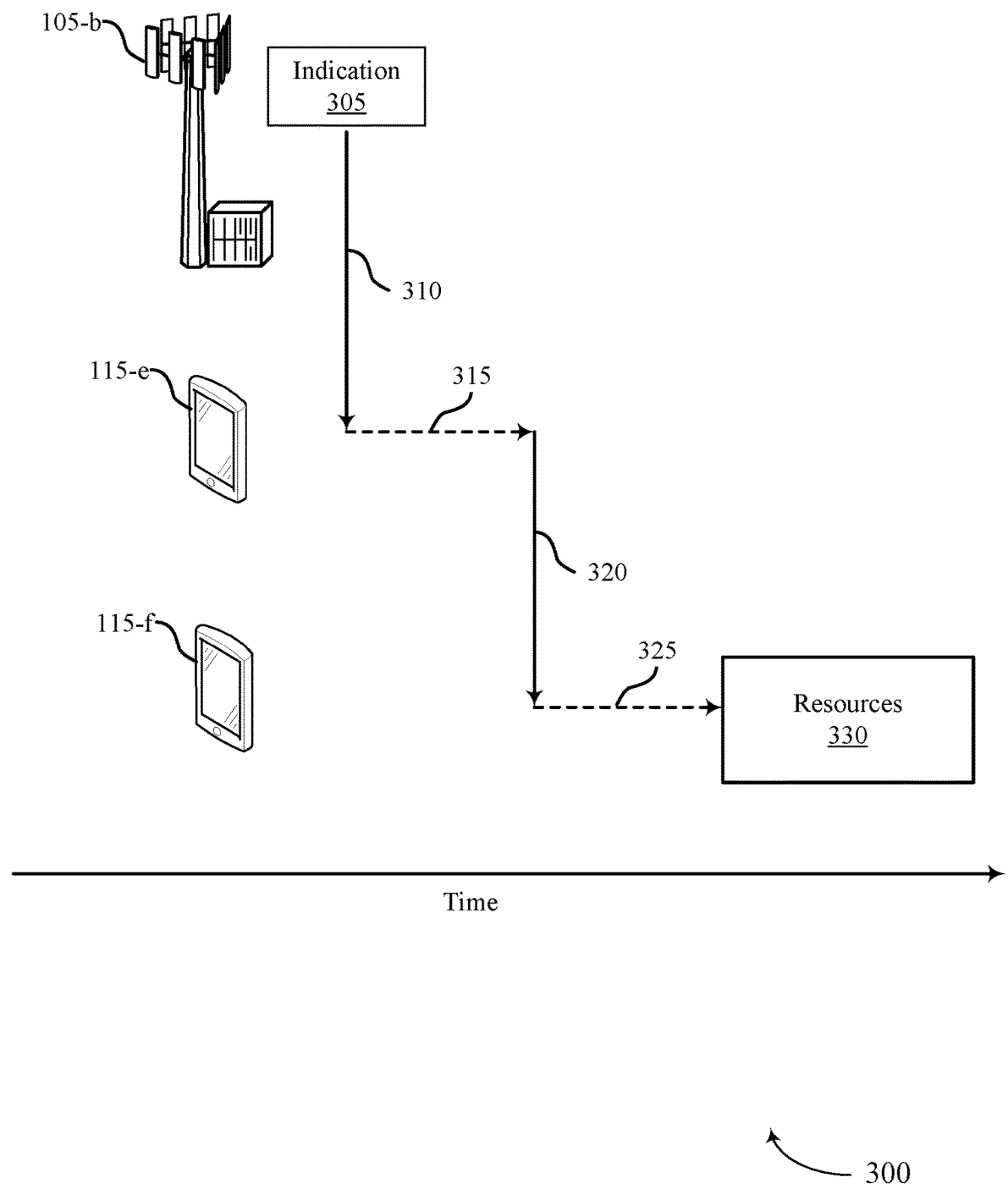
FIG. 3 illustrates an example of a timing diagram that supports preemption for sidelink communications in accordance with aspects of the present disclosure.

FIG. 3 illustrates an example of a timing diagram 300 that supports preemption for sidelink communications in accordance with one or more aspects of the present disclosure. In some examples, the timing diagram 300 may implement aspects of a wireless communications systems 100 or 200. The timing diagram 300 may include a base station 105-b, a UE 115-e, and a UE 115-f, which may be examples of the corresponding devices as described herein. In some examples, the timing diagram 300 may correspond to a timing associated with a sidelink preemption technique.

An indication 305 may indicate a set of resources 330 used for sidelink communication that at least partially overlap resources for access link communication. In some examples, the indication 305 may be a sidelink preemption indication. The base station 105-b may transmit the indication 305 to the UE 115-e, which may act as a relay between the base station 105-b and the UE 115-f. After transmission time 310, the UE 115-e may receive the indication 305 and may process the indication 305 during the processing time 315. Based on the received indication 305, the UE 115-e may determine to refrain from transmitting or receiving sidelink communications on the set of resources 330. In some examples, the indication 305 may be an uplink cancellation indication indicating the set of resources 330 for uplink cancellation. Based on the uplink cancellation indication, the UE 115-e may determine that sidelink communications are scheduled via resources that at least partially overlap the set of resources and may determine to preempt sidelink communications. In some examples, the UE 115-e may preempt all sidelink communications independent of priority levels associated with the sidelink communications or uplink communications. Alternatively, the UE 115-e may preempt sidelink communications having a priority below a threshold and perform sidelink communications having a priority above the threshold. In some cases, the indication 305 may include the threshold, or the priority of the set of resources 330.

In some examples, the UE 115-*e* may relay the indication 305 to the UE 115-*f*. For example, after a processing time 315, the UE 115-*e* may transmit the indication 305 to the UE 115-*f*. After a transmission time 320, the UE 115-*f* may receive the indication 305 and may process the indication 305 during the processing time 325. The UE 115-*f* may determine to refrain from performing sidelink communications using the set of resources 330 based on receiving the indication 305.

In some examples, the UE 115-*e*, the UE 115-*f*, or both may operate according to a Mode 2 resource allocation, where relaying the indication 305 includes sensing and resource reservation. Sensing and resource reservation may introduce an unknown latency which may cause timing ambiguity such that the UE 115-*e* and the UE 115-*f* are unable to determine a timing delay between the initial transmission of the indication 305 and the set of resources 330. In some examples, where timing ambiguity exists, the UE 115-*e* may adjust the indication 305 based on a time at which the UE 115-*e* may be able to relay the indication 305. In some examples, the UE 115-*e* may remove bits indicating resource allocation for a number of slots if the UE 115-*e* determines that the information is no longer applicable (e.g., is stale) based on a time at which the UE 115-*e* may be able to relay the indication 305. For example, if the indication 305 indicates resource allocation for ten slots, and the UE 115-*e* determines that the information associated with five of the ten slots is not applicable, the UE 115-*e* may adjust the indication 305 to indicate the still-applicable five slots and pad the indication 305 with zeros to maintain a payload size. Additionally, or alternatively, the UE 115-*e* may receive, along with the indication 305, an indication of a time (e.g., a slot index of direct frame number index) at which the indication 305 was generated. Accordingly, the UE 115-*e* may modify the indication 305 based on the indicated time. Similarly, the UE 115-*f* may receive the indication 305 and determine the set of resources 330 to preempt. In some example, the UE 115-*e* may relay the indication 305 only if a transmission or processing time will enable the UE 115-*f* to apply the preemption to the correct set of resources 330. Implementing various aspects of the timing diagram 300 may allow one or more base stations 105, UEs 115, or any combination thereof to accurately determine sidelink resources for preemption. Such techniques may mitigate or reduce the risk of causing interference on other channels or communication links.

Figure 4:
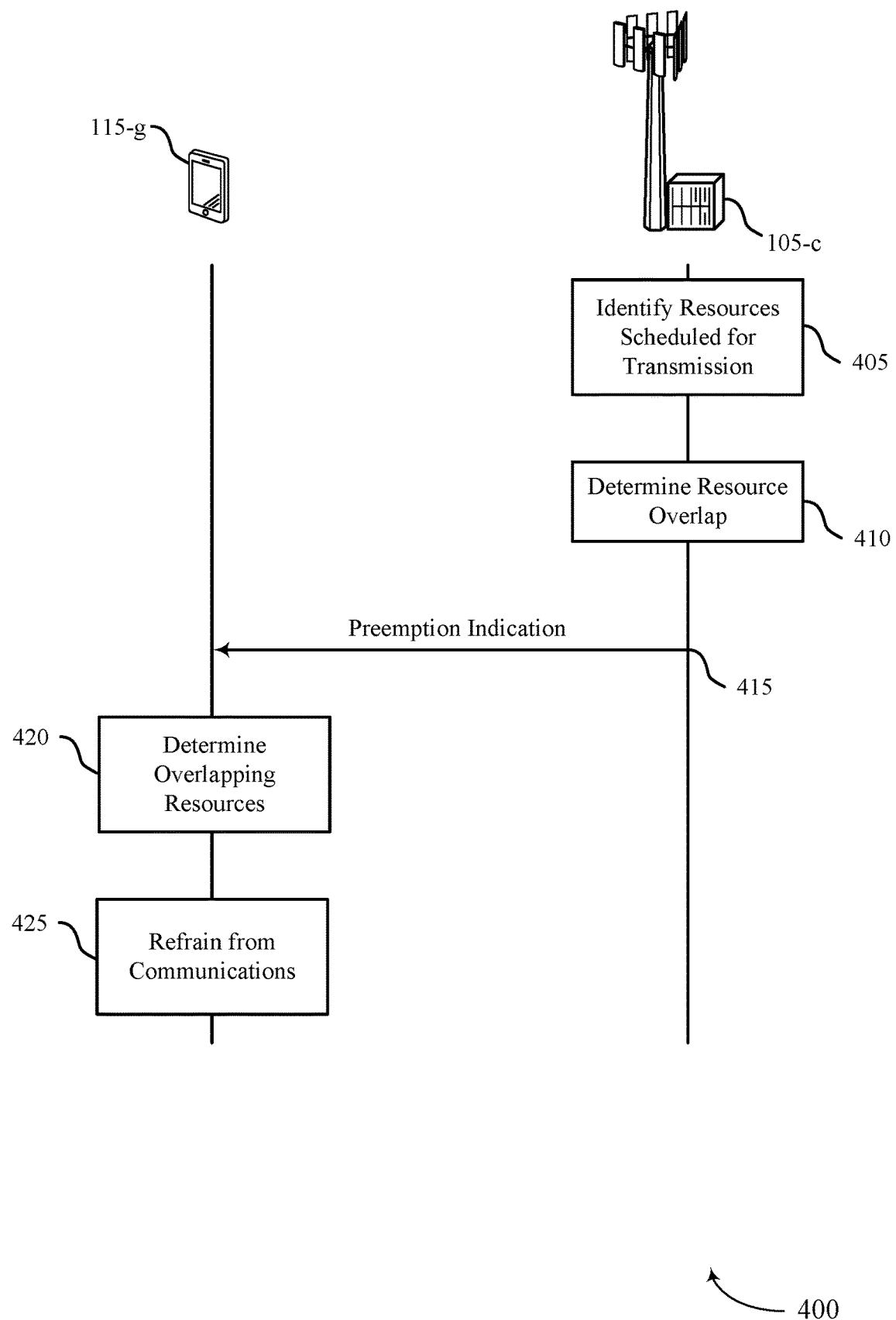
FIG. 4 illustrates an example of a process flow that supports preemption for sidelink communications in accordance with aspects of the present disclosure.

FIG. 4 illustrates an example of a process flow 400 that supports preemption for sidelink communications in accordance with one or more aspects of the present disclosure. In some examples, the process flow 400 may implement aspects of a wireless communications systems 100 or 200, a timing diagram 300, or any combination thereof as described with reference to FIGS. 1-3. The process flow 400 may include a UE 115-*g* and a base station 105-*c* which may be examples of the corresponding devices described herein. Alternative examples of the following may be implemented where some processes are performed in a different order than described or not performed at all. In some implementations, processes may include additional features not mentioned below, or further processes may be added.

At 405, the base station 105-*c* may identify resources scheduled for transmission over an access link. For example, the base station 105-*c* may determine to transmit or receive a message over a set of resources over a communication link with a UE 115.

At 410, the base station 105-*c* may determine an overlap between the resources scheduled for the access link and resources scheduled for sidelink communication.

At 415, the base station 105-*c* may transmit a preemption indication to the UE 115-*g* indicating the overlapping resources. In some examples, the base station 105-*c* may transmit the preemption indication in a DCI message formatted for uplink cancellation (e.g., DCI format 2_4). In some examples, the base station 105-*c* may transmit the preemption indication in a DCI message formatted for sidelink preemption.

At 420, the UE 115-*g* may determine the overlapping resources based on the preemption indication received from the base station 105-*c*. For example, the UE 115-*g* may determine that sidelink communications are scheduled on a set of resources that overlap with resources scheduled for access link communications based on the preemption indication.

At 425, the UE 115-*g* may refrain from performing sidelink communication on the overlapping resources. For example, if the UE 115-*g* is operating as a transmitting device, the UE 115-*g* may refrain from transmitting on the overlapping resources. If the UE 115-*g* is operating as a receiving device, the UE 115-*g* may refrain from monitoring for a PSCCH or PSSCH transmission on the overlapping resources or may refrain from decoding the overlapping resources. Implementing various aspects of the process flow 400 may allow for decreased interference between access links and sidelinks in wireless communications systems.

Figure 5:
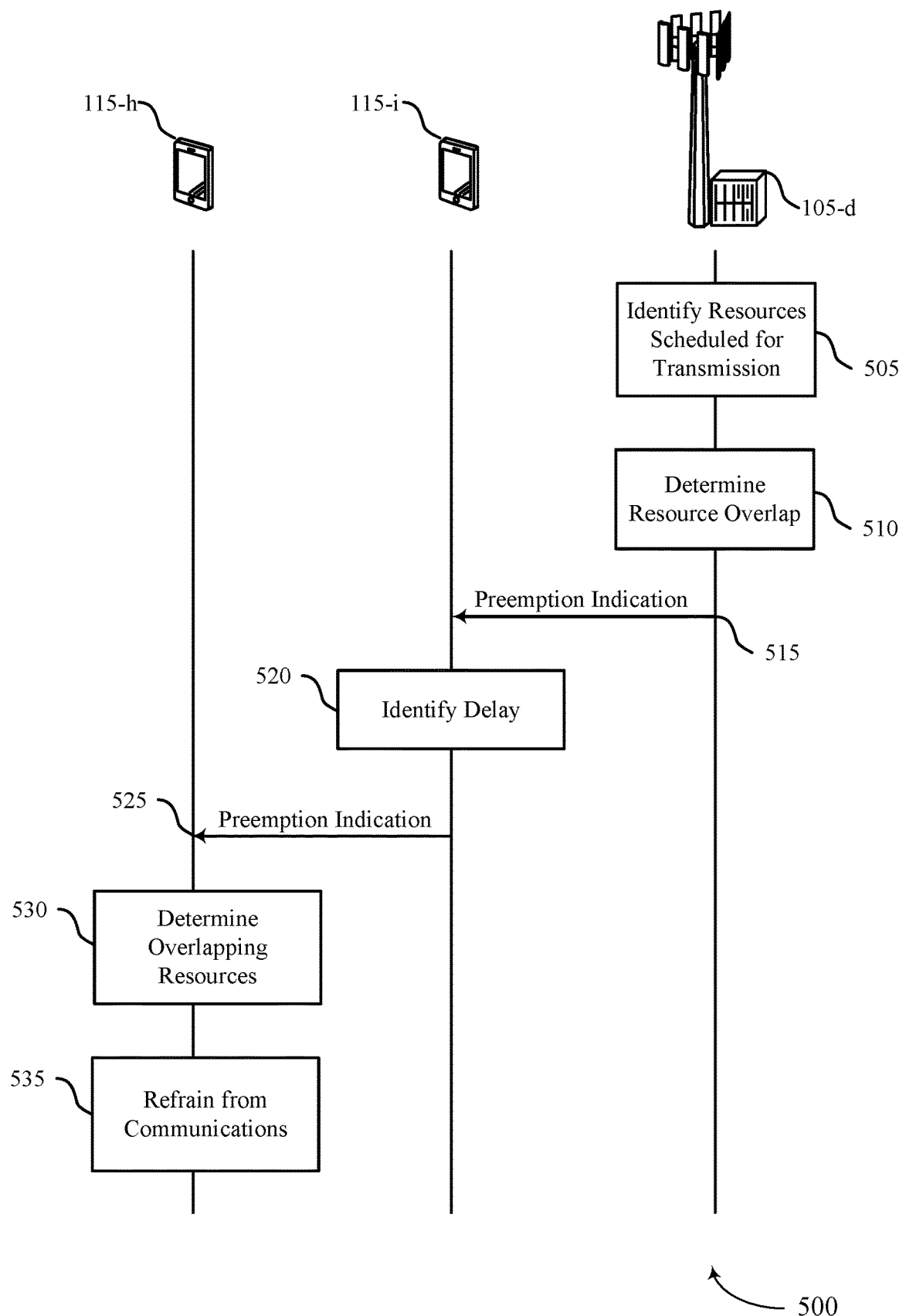
FIG. 5 illustrates an example of a process flow that supports preemption for sidelink communications in accordance with aspects of the present disclosure.

FIG. 5 illustrates an example of a process flow 500 that supports preemption for sidelink communications in accordance with one or more aspects of the present disclosure. In some examples, the process flow 500 may implement aspects of a wireless communications systems 100 or 200, a timing diagram 300, a process flow 400, or any combination thereof as described with reference to FIGS. 1-4. The process flow 500 may include a UE 115-*h*, a UE 115-*i*, and a base station 105-*d* which may be examples of the corresponding devices described herein. In some examples, the UE 115-*i* may operate within a coverage area associated with the base station 105-*d* and the UE 115-*h* may operate outside of the coverage area. Alternative examples of the following may be implemented where some processes are performed in a different order than described or not performed at all. In some implementations, processes may include additional features not mentioned below, or further processes may be added.

At 505, the base station 105-*d* may identify resources scheduled for transmission over an access link. For example, the base station 105-*d* may determine to transmit or receive a message over a set of resources over a communication link with a UE 115.

At 510, the base station 105-*d* may determine an overlap between the resources scheduled for the access link and resources scheduled for sidelink communication.

At 515, the base station 105-*d* may transmit a preemption indication to the UE 115-*i* indicating the overlapping resources. In some examples, the base station 105-*c* may transmit the preemption indication in a DCI message formatted for uplink cancellation (e.g., DCI format 2_4). In some examples, the base station 105-*c* may transmit the preemption indication in a DCI message formatted for sidelink preemption.

At 520, the UE 115-*i* may determine a delay associated with relaying the preemption indication to the UE 115-*h*. For example, the UE 115-*i* may determine transmission time or a processing time associated with relaying the preemption indication to the UE 115-*h*. In some examples, the UE 115-*i* may determine that information included in the preemption indication is not applicable based on the identified delay. Accordingly, the UE 115-*i* may adjust the preemption indication so that the preemption indication includes only applicable information.

At 525, the UE 115-*i* may transmit the preemption indication to the UE 115-*h*. In some examples, the UE 115-*i* may transmit the preemption indication in a SCI2 message or a MAC-CE.

At 530, the UE 115-*h* may determine the set of overlapping resources based on receiving the preemption indication from the UE 115-*i*. For example, the UE 115-*h* may determine that sidelink communications are scheduled on a set of resources that overlap with resources scheduled for access link communications based on the preemption indication.

At 535, the UE 115-*h* may refrain from performing sidelink communication on the overlapping resources. For example, if the UE 115-*h* is operating as a transmitting device, the UE 115-*h* may refrain from transmitting on the overlapping resources. If the UE 115-*h* is operating as a receiving device, the UE 115-*g* may refrain from monitoring for a PSCCH or PSSCH transmission on the overlapping resources or may refrain from decoding the overlapping resources. Implementing various aspects of the process flow 500 may allow for decreased interference between access links and sidelinks in wireless communications systems.

Figure 6:
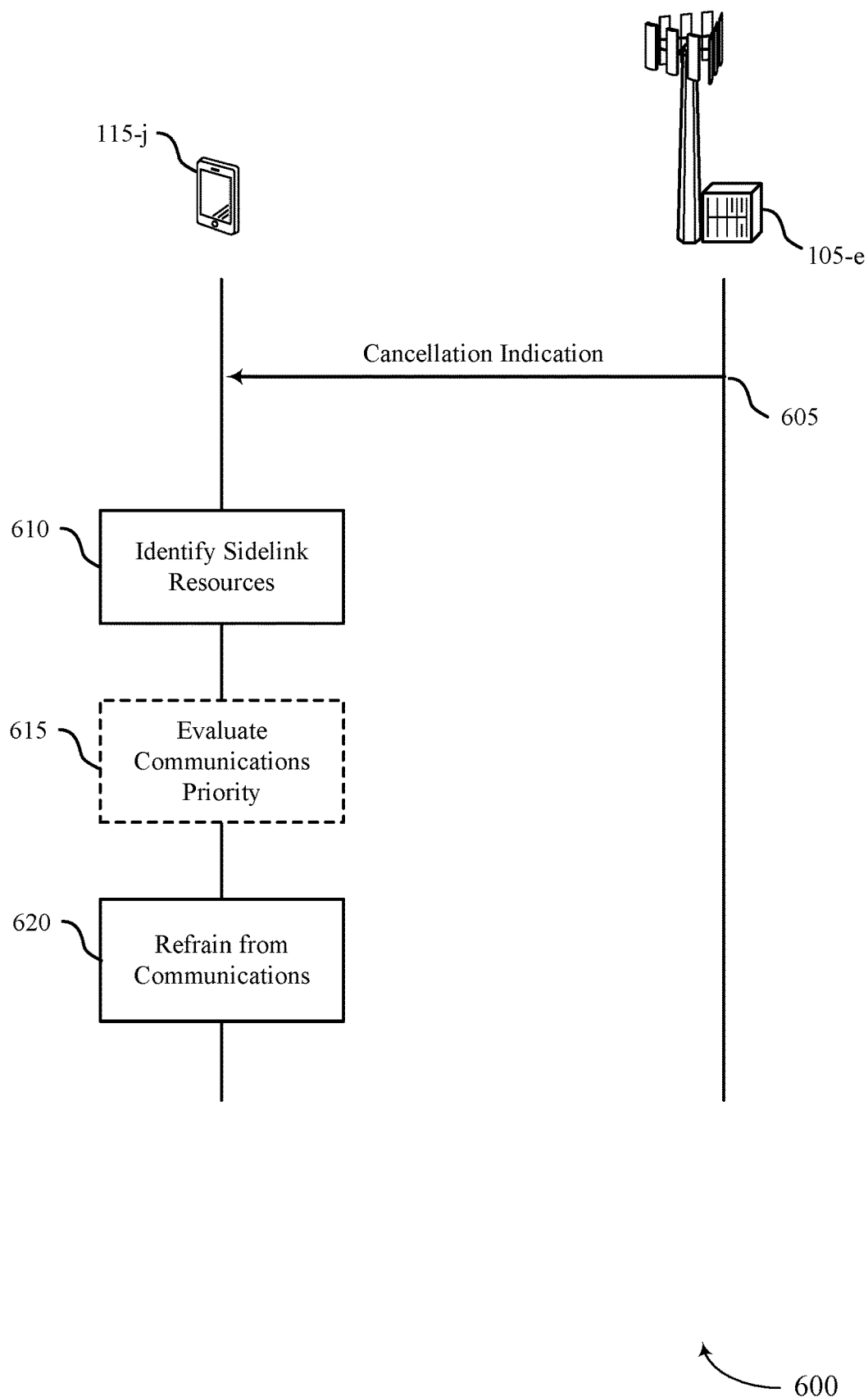
FIG. 6 illustrates an example of a process flow that supports preemption for sidelink communications in accordance with aspects of the present disclosure.

FIG. 6 illustrates an example of a process flow 600 that supports preemption for sidelink communications in accordance with one or more aspects of the present disclosure. In some examples, the process flow 600 may implement aspects of a wireless communications system 100 or 200, a timing diagram 300, a process flow 400 or 500, or any combination thereof as described with reference to FIGS. 1-5. The process flow 600 may include a UE 115-*j* and a base station 105-*e* which may be examples of the corresponding devices described herein. Alternative examples of the following may be implemented where some processes are performed in a different order than described or not performed at all. In some implementations, processes may include additional features not mentioned below, or further processes may be added.

At 605, the base station 105-*e* may transmit an uplink cancellation indication to the UE 115-*j*. For example, the base station 105-*e* may determine a set of resources on an access link between the UE 115-*j* and the base station 105-*e* for cancellation. The uplink cancellation indication may indicate the set of resources.

At 610, the UE 115-*j* may identify sidelink resources that at least partially overlap the set of resources indicated by the uplink cancellation indication. For example, the UE 115-*j* may determine that sidelink communications are scheduled to be performed on the set of resources indicated by the uplink cancellation indication.

At 615, the UE 115-*j* may evaluate one or more priorities associated with the sidelink communications. For example, the UE 115-*j* may determine that some scheduled communications have a priority below a threshold and others have a priority above the threshold.

At 620, the UE 115-*j* may refrain from sidelink communications based on the uplink cancellation indication received from the base station 105-*e*. In some examples, the UE 115-*j* may determine to preempt sidelink communications with a priority below the threshold and may perform the communications with a priority above the threshold. In some examples, the UE 115-*j* may preempt all sidelink communications scheduled on the overlapping resources. If the UE 115-*j* is operating as a transmitting device, the UE 115-*j* may refrain from transmitting on the overlapping resources. If the UE 115-*j* is operating as a receiving device, the UE 115-*j* may refrain from monitoring for a PSCCH or PSSCH transmission on the overlapping resources or may refrain from decoding the overlapping resources. Implementing various aspects of the process flow 600 may allow for decreased interference between access links and sidelinks in wireless communications systems.

Figure 7:
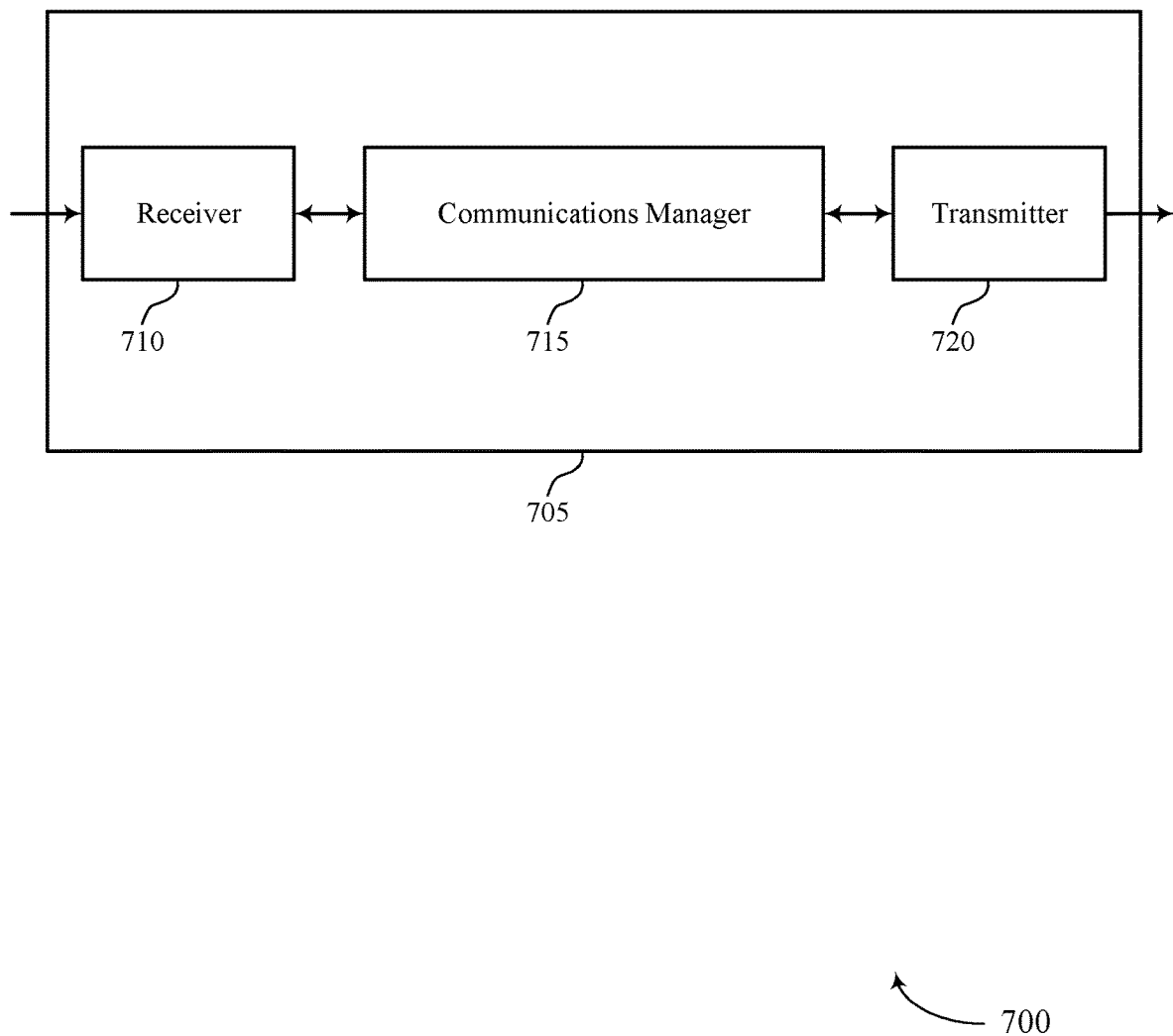
FIGS. 7 and 8 show block diagrams of devices that support preemption for sidelink communications in accordance with aspects of the present disclosure.

FIG. 7 shows a block diagram 700 of a device 705 that supports preemption for sidelink communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to preemption for sidelink communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, a sidelink preemption indication for preemption of sidelink communications for the UE, identify a delay after receiving the sidelink preemption indication for relaying the sidelink preemption indication to the one or more remote UEs, and transmit, to the one or more remote UEs, the sidelink preemption indication in accordance with the identified delay.

The communications manager 715 may also receive an indication of preemption of sidelink communications for the first UE, the indication including a set of resources for sidelink preemption, determine that resources of a sidelink message scheduled for communication between the first UE and a second UE via a sidelink communications link overlap at least a portion of the set of resources for sidelink preemption based on the indication of preemption of sidelink communications, and refrain from transmitting or monitoring for the sidelink message over the at least the portion of the set of resources based on determining that resources of the sidelink message scheduled for communication between the first UE and the second UE overlap at least the portion of the set of resources for sidelink preemption. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a mobile device modem, and the receiver 710 and transmitter 720 may be implemented as analog components (e.g., amplifiers, filters, antennas) coupled with the mobile device modem to enable wireless transmission and reception over one or more bands.

The communications manager 715 as described may be implemented to realize one or more potential advantages. One implementation may allow the device 705 to receive a preemption indication indicating a set of resources for preemption. Based on the techniques for receiving a preemption indication, the device 705 may support preempting or refraining from sidelink communications on a set of resources. As such, the device 705 may exhibit improved reliability and reduced interference, among other benefits, which may reduce power consumption and increase battery life.

Figure 8:
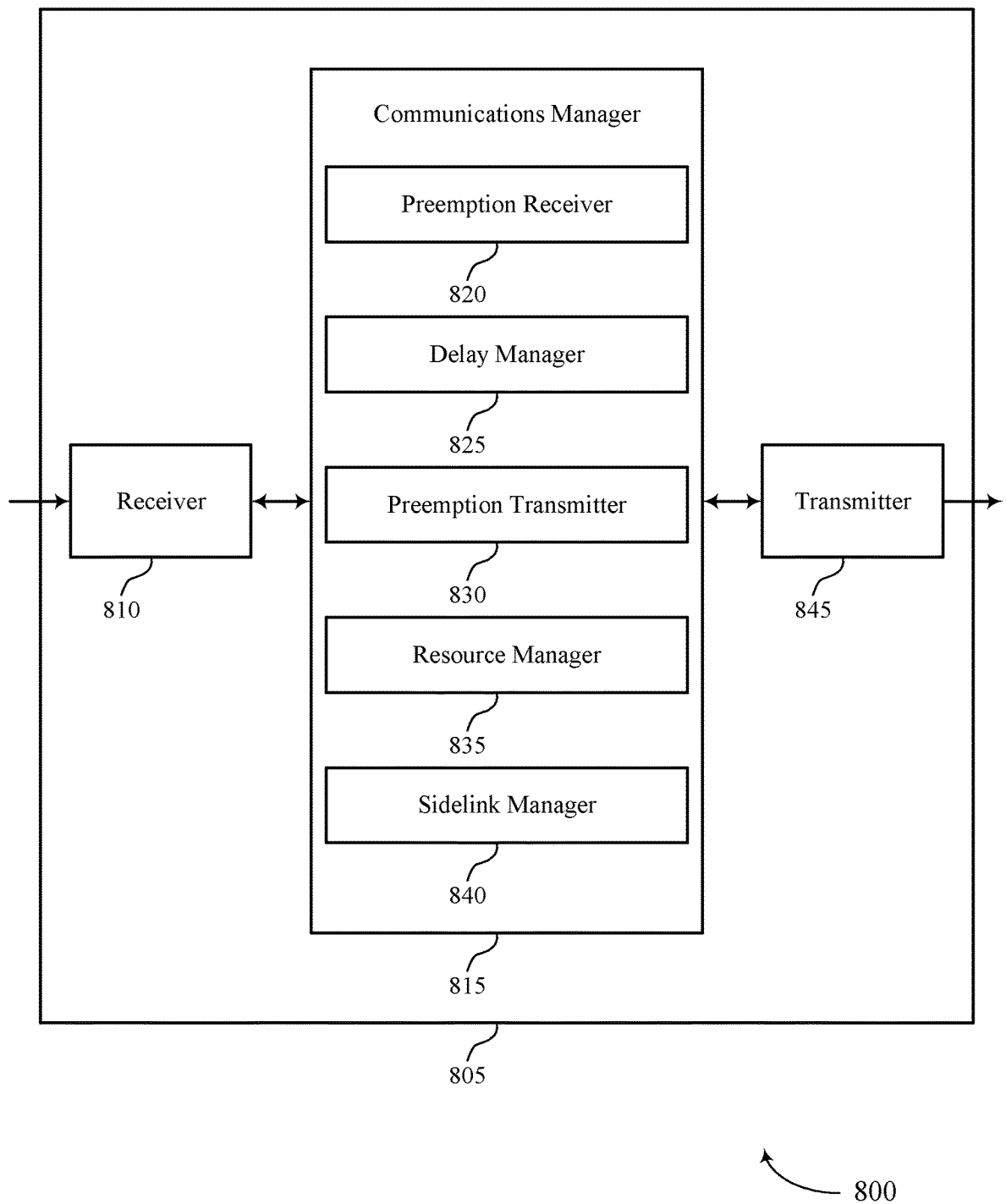

FIG. 8 shows a block diagram 800 of a device 805 that supports preemption for sidelink communications in accordance with aspects of the present disclosure. The device 805 may be an example of aspects of a device 705, or a UE 115 as described herein. The device 805 may include a receiver 810, a communications manager 815, and a transmitter 845. The device 805 may also include a processor. Each of these components may be in communication with one another (e.g., via one or more buses).

The receiver 810 may receive information such as packets, user data, or control information associated with various information channels (e.g., control channels, data channels, and information related to preemption for sidelink communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a preemption receiver 820, a delay manager 825, a preemption transmitter 830, a resource manager 835, and a sidelink manager 840. The communications manager 815 may be an example of aspects of the communications manager 1010 described herein.

The preemption receiver 820 may receive, from a base station, a sidelink preemption indication for preemption of sidelink communications for the UE. In some examples, the preemption receiver 820 may determine that the sidelink preemption indication is for one or more remote UEs in communication with the UE.

The delay manager 825 may identify a delay after receiving the sidelink preemption indication for relaying the sidelink preemption indication to the one or more remote UEs.

The preemption transmitter 830 may transmit, to the one or more remote UEs, the sidelink preemption indication in accordance with the identified delay.

The preemption receiver 820 may receive an indication of preemption of sidelink communications for the first UE, the indication including a set of resources for sidelink preemption.

The resource manager 835 may determine that resources of a sidelink message scheduled for communication between the first UE and a second UE via a sidelink communications link overlap at least a portion of the set of resources for sidelink preemption based on the indication of preemption of sidelink communications.

The sidelink manager 840 may refrain from transmitting or monitoring for the sidelink message over the at least the portion of the set of resources based on determining that resources of the sidelink message scheduled for communication between the first UE and the second UE overlap at least the portion of the set of resources for sidelink preemption.

The transmitter 845 may transmit signals generated by other components of the device 805. In some examples, the transmitter 845 may be collocated with a receiver 810 in a transceiver module. For example, the transmitter 845 may be an example of aspects of the transceiver 1020 described with reference to FIG. 10. The transmitter 845 may utilize a single antenna or a set of antennas.

Figure 9:
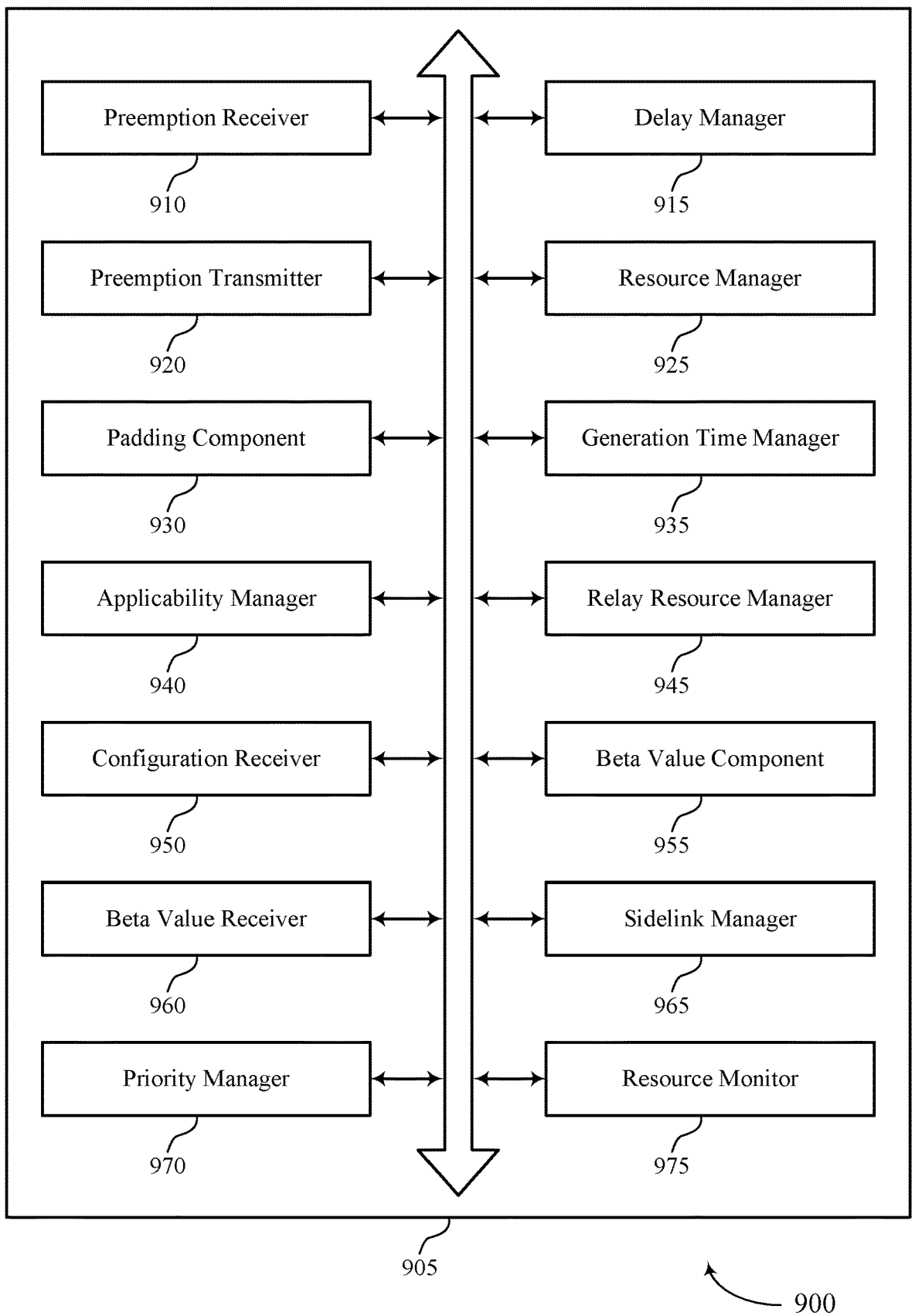
FIG. 9 shows a block diagram of a communications manager that supports preemption for sidelink communications in accordance with aspects of the present disclosure.

FIG. 9 shows a block diagram 900 of a communications manager 905 that supports preemption for sidelink communications in accordance with aspects of the present disclosure. The communications manager 905 may be an example of aspects of a communications manager 715, a communications manager 815, or a communications manager 1010 described herein. The communications manager 905 may include a preemption receiver 910, a delay manager 915, a preemption transmitter 920, a resource manager 925, a padding component 930, a generation time manager 935, an applicability manager 940, a relay resource manager 945, a configuration receiver 950, a beta value component 955, a beta value receiver 960, a sidelink manager 965, a priority manager 970, and a resource monitor 975. Each of these modules may communicate, directly or indirectly, with one another (e.g., via one or more buses).

The preemption receiver 910 may receive, from a base station, a sidelink preemption indication for preemption of sidelink communications for the UE and one or more remote UEs in communication with the UE.

In some examples, the preemption receiver 910 may receive an indication of preemption of sidelink communications for the first UE, the indication including a set of resources for sidelink preemption.

In some examples, the preemption receiver 910 may receive an uplink cancellation indication for cancellation of an uplink message by the first UE, where the uplink message is scheduled via the at least the portion of the set of resources.

In some examples, the preemption receiver 910 may receive a sidelink preemption indication for preemption of sidelink communications for the first UE.

In some examples, the preemption receiver 910 may receive a sidelink preemption indication based on the monitoring.

In some examples, the preemption receiver 910 may receive a sidelink preemption indication from a base station or a relay UE in communication with the first UE.

The delay manager 915 may identify a delay after receiving the sidelink preemption indication for relaying the sidelink preemption indication to the one or more remote UEs.

In some examples, the delay manager 915 may determine a transmission timing for relaying the sidelink preemption indication to the one or more remote UEs based on the delay.

In some examples, the delay manager 915 may determine a processing time for processing the sidelink preemption indication at the UE.

In some examples, the delay manager 915 may determine the delay based on the processing time for processing the sidelink preemption indication at the UE.

The preemption transmitter 920 may transmit, to the one or more remote UEs, the sidelink preemption indication in accordance with the identified delay.

In some examples, the preemption transmitter 920 may transmit an indication of a subset of the set of resources in the sidelink preemption indication to the one or more remote UEs based on the transmission timing.

In some examples, the preemption transmitter 920 may transmit an indication of the generation time with the sidelink preemption indication.

In some examples, the preemption transmitter 920 may transmit an indication of the modified generation time with the sidelink preemption indication.

In some examples, the preemption transmitter 920 may transmit, in the sidelink preemption indication, an indication of a preemption periodicity associated with the sidelink preemption indication.

In some examples, the preemption transmitter 920 may transmit the sidelink preemption indication via the set of resources.

In some examples, the preemption transmitter 920 may perform a channel sensing procedure on a set of shared resources based on receiving the preemption indication.

In some examples, the preemption transmitter 920 may transmit the sidelink preemption indication using at least a portion of the set of shared resources based on a successful channel sensing procedure.

In some examples, the preemption transmitter 920 may transmit a sidelink control message that includes the sidelink preemption indication, where a format of the sidelink control message is specific to sidelink preemption indications.

In some examples, the preemption transmitter 920 may transmit a sidelink shared channel that includes the sidelink preemption indication, where the sidelink preemption indication is indicated via a MAC-CE of the sidelink shared channel.

The resource manager 925 may determine that resources of a sidelink message scheduled for communication between the first UE and a second UE via a sidelink communications link overlap at least a portion of the set of resources for sidelink preemption based on the indication of preemption of sidelink communications.

In some examples, the resource manager 925 may determine a set of resources for preemption of sidelink communications based on the sidelink preemption indication.

In some examples, determining that a second subset of the set of resources for preemption of sidelink communications includes stale resources based on the delay, where the subset is non-overlapping with the second subset.

The sidelink manager 965 may refrain from transmitting or monitoring for the sidelink message over the at least the portion of the set of resources based on determining that resources of the sidelink message scheduled for communication between the first UE and the second UE overlap at least the portion of the set of resources for sidelink preemption.

In some examples, the sidelink manager 965 may refrain from transmitting a sidelink message over the at least the portion of the set of resources based on the uplink cancellation indication.

In some examples, the sidelink manager 965 may transmit a second sidelink message based on a priority of the second sidelink message being above the priority level indicated by the uplink cancellation indication.

In some examples, the sidelink manager 965 may refrain from transmitting or monitoring for the sidelink message over the at least the portion of the set of resources based on the generation time.

In some examples, the sidelink manager 965 may refrain from transmitting or monitoring for the sidelink message based on determining that the priority level of the sidelink message is lower than the priority level of the indication of preemption of sidelink communications.

The padding component 930 may pad a set of bits corresponding to the subset of the set of resources based on a payload size of the preemption indication.

The generation time manager 935 may determine a generation time associated with generation of the sidelink preemption indication at the base station based on receiving the sidelink preemption indication.

In some examples, the generation time manager 935 may determine a generation time associated with generation of the sidelink preemption indication at the base station based on receiving the sidelink preemption indication.

In some examples, the generation time manager 935 may modify the generation time associated with generation of the sidelink preemption indication based on a reception time of the sidelink preemption indication at the UE.

In some examples, the generation time manager 935 may identify a generation time of the sidelink preemption indication based on the sidelink preemption indication.

The applicability manager 940 may determine an applicability of the sidelink preemption indication for preemption of sidelink communications for the one or more remote UEs based on the delay, where the sidelink preemption indication is transmitted based on determining the applicability of the sidelink preemption indication.

The relay resource manager 945 may determine a set of resources dedicated for transmission of the sidelink preemption indication.

The configuration receiver 950 may receive a configuration from the base station that indicates the set of resources dedicated for transmission of the sidelink preemption indication.

The beta value component 955 may determine a beta value associated with a number of resources allocated for sidelink control information, where the sidelink preemption indication is transmitter based on the beta value.

The beta value receiver 960 may receive an indication of the beta value from the base station.

The priority manager 970 may refrain from transmitting the sidelink message based on a priority of the sidelink message being below a priority level indicated by the uplink cancellation indication.

In some examples, the priority manager 970 may determine that a priority level of the sidelink message is lower than a priority level of the indication of preemption of sidelink communications.

In some cases, the priority level is configured for the first UE, a given resource pool, a given carrier, a given transmission type, a given zone identifier, a given reference signal received power, or any combination thereof.

The resource monitor 975 may monitor resources dedicated for sidelink preemption indications.

Figure 10:
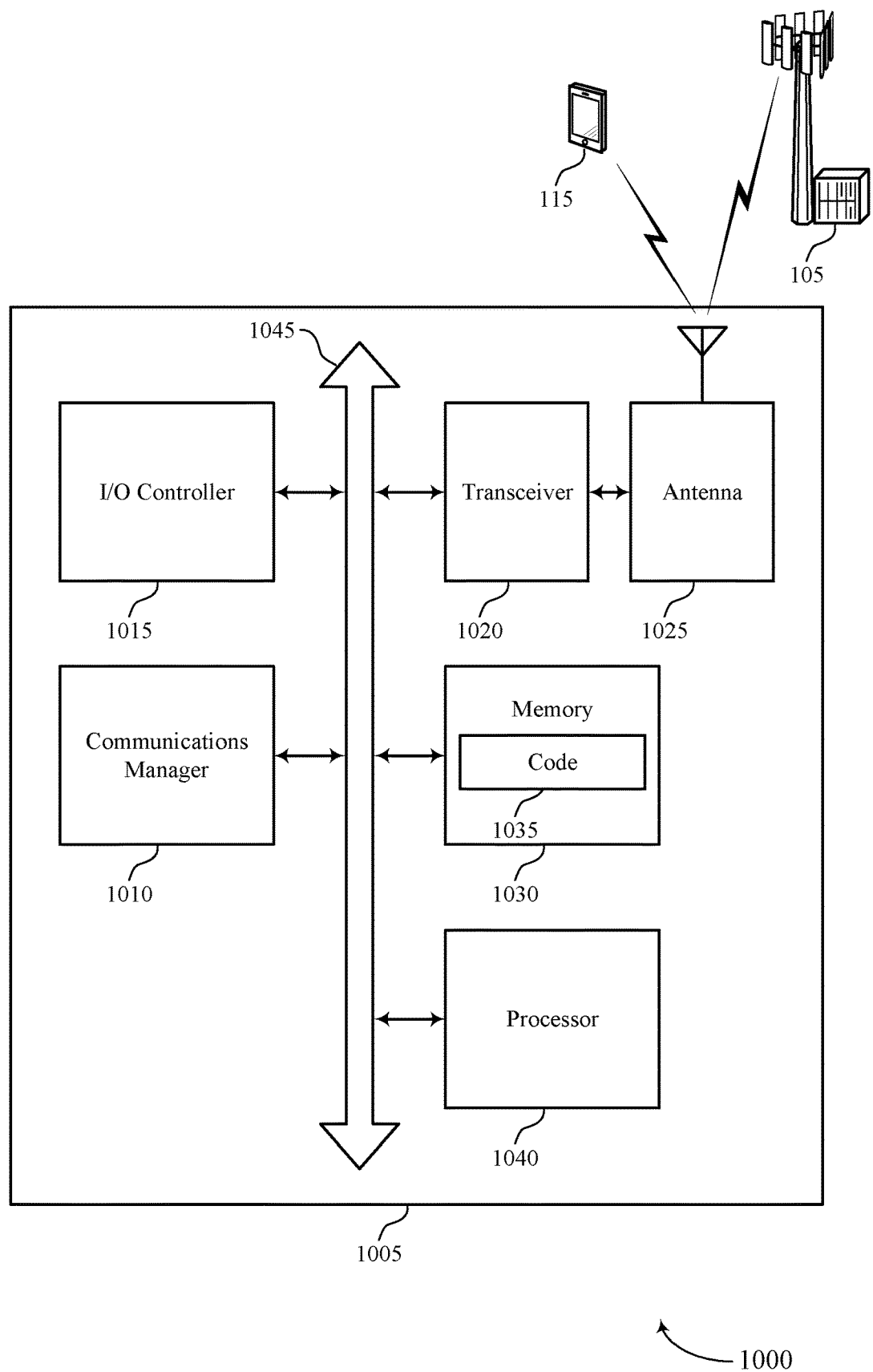
FIG. 10 shows a diagram of a system including a device that supports preemption for sidelink communications in accordance with aspects of the present disclosure.

FIG. 10 shows a diagram of a system 1000 including a device 1005 that supports preemption for sidelink communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, a sidelink preemption indication for preemption of sidelink communications for the UE and one or more remote UEs in communication with the UE, identify a delay after receiving the sidelink preemption indication for relaying the sidelink preemption indication to the one or more remote UEs, and transmit, to the one or more remote UEs, the sidelink preemption indication in accordance with the identified delay.

The communications manager 1010 may also receive an indication of preemption of sidelink communications for the first UE, the indication including a set of resources for sidelink preemption, determine that resources of a sidelink message scheduled for communication between the first UE and a second UE via a sidelink communications link overlap at least a portion of the set of resources for sidelink preemption based on the indication of preemption of sidelink communications, and refrain from transmitting or monitoring for the sidelink message over the at least the portion of the set of resources based on determining that resources of the sidelink message scheduled for communication between the first UE and the second UE overlap at least the portion of the set of resources for sidelink preemption.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and ready-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting preemption for sidelink communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
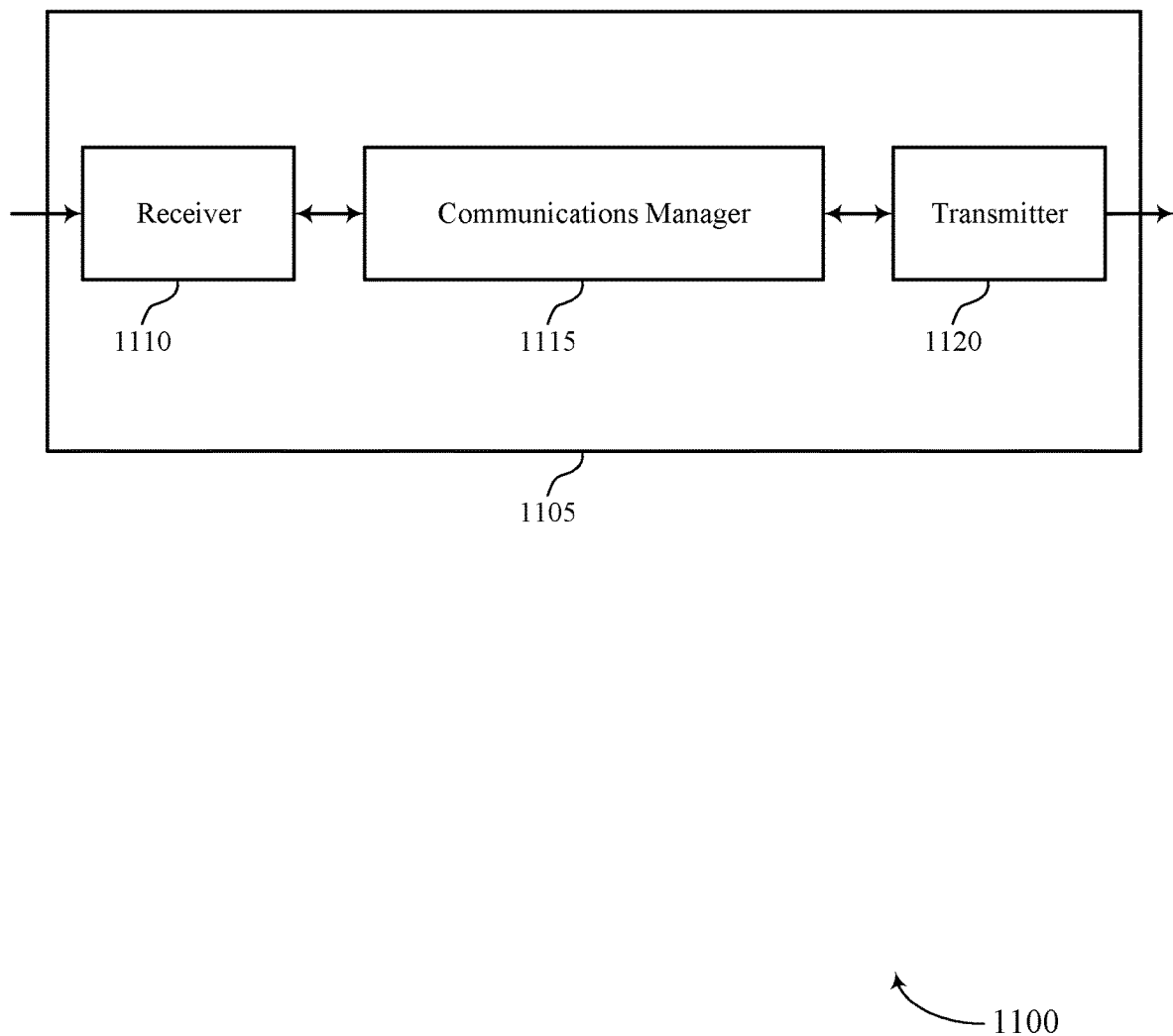
FIGS. 11 and 12 show block diagrams of devices that support preemption for sidelink communications in accordance with aspects of the present disclosure.

FIG. 11 shows a block diagram 1100 of a device 1105 that supports preemption for sidelink communications in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to preemption for sidelink communications, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a message scheduled over a set of time-frequency resources for communication between the base station and a UE, determine that time-frequency resources for sidelink communications at least partially overlap the set of time-frequency resources of the message between the base station and the UE, and transmit, to a group of UEs, a sidelink preemption indication for preemption of sidelink communications based on determining that the time-frequency resources for sidelink communications at least partially overlap the set of time-frequency resources. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
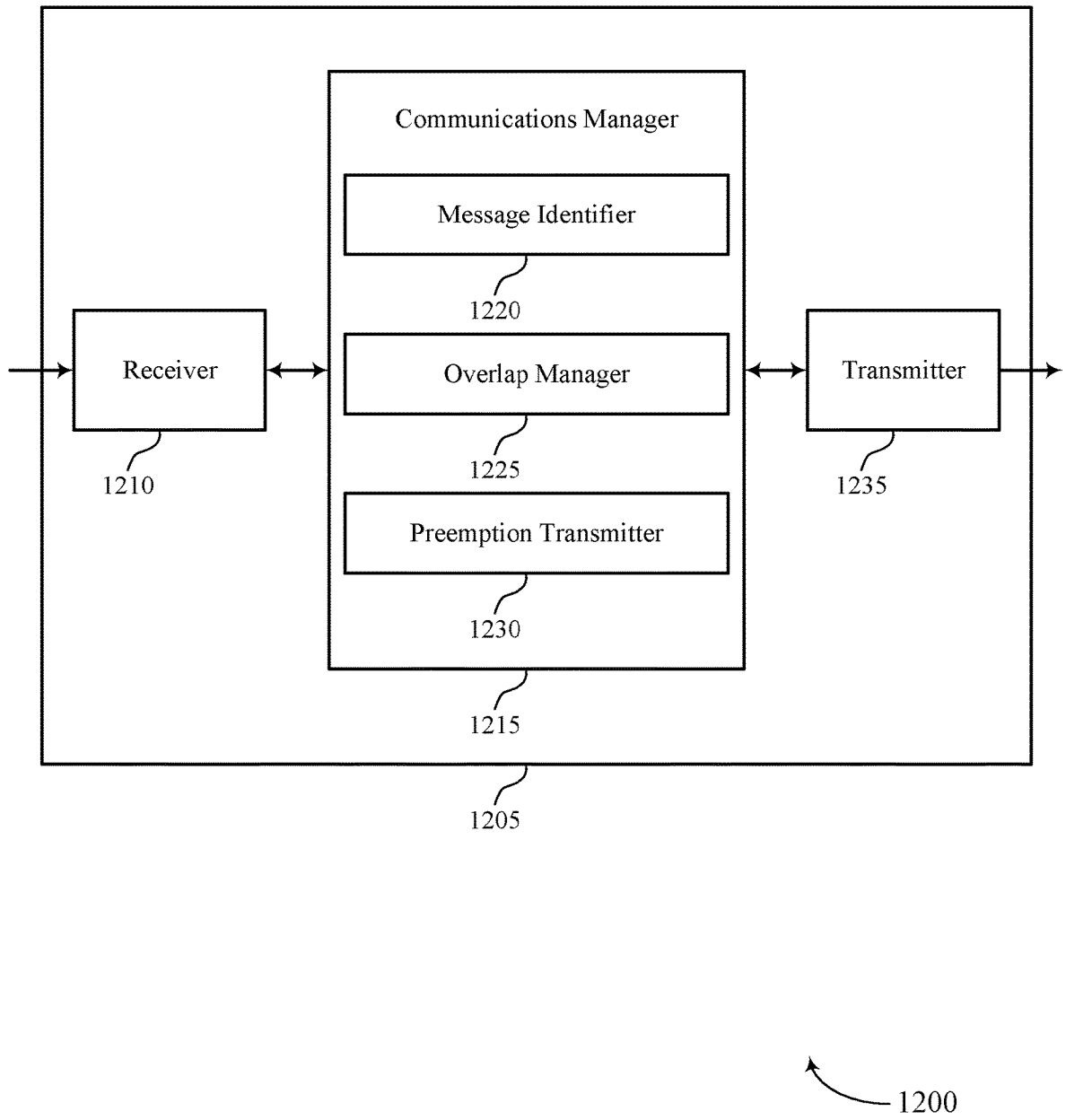

FIG. 12 shows a block diagram 1200 of a device 1205 that supports preemption for sidelink communications in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to preemption for sidelink communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a message identifier 1220, an overlap manager 1225, and a preemption transmitter 1230. The communications manager 1215 may be an example of aspects of the communications manager 1410 described herein.

The message identifier 1220 may identify a message scheduled over a set of time-frequency resources for communication between the base station and a UE.

The overlap manager 1225 may determine that time-frequency resources for sidelink communications at least partially overlap the set of time-frequency resources of the message between the base station and the UE.

The preemption transmitter 1230 may transmit, to a group of UEs, a sidelink preemption indication for preemption of sidelink communications based on determining that the time-frequency resources for sidelink communications at least partially overlap the set of time-frequency resources.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
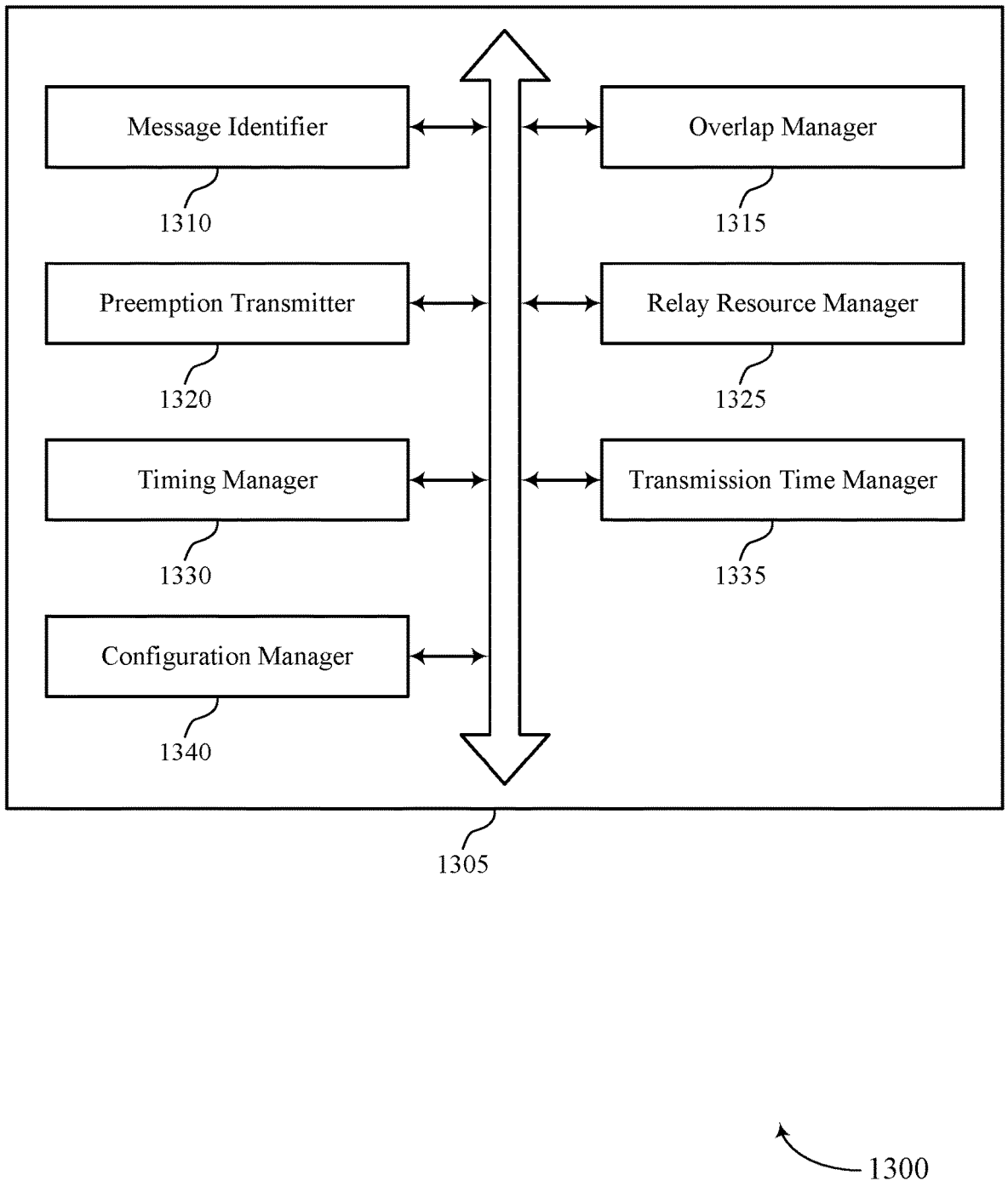
FIG. 13 shows a block diagram of a communications manager that supports preemption for sidelink communications in accordance with aspects of the present disclosure.

FIG. 13 shows a block diagram 1300 of a communications manager 1305 that supports preemption for sidelink communications in accordance with aspects of the present disclosure. The communications manager 1305 may be an example of aspects of a communications manager 1115, a communications manager 1215, or a communications manager 1410 described herein. The communications manager 1305 may include a message identifier 1310, an overlap manager 1315, a preemption transmitter 1320, a relay resource manager 1325, a timing manager 1330, a transmission time manager 1335, and a configuration manager 1340. Each of these modules may communicate, directly or indirectly, with one another (e.g., via one or more buses).

The message identifier 1310 may identify a message scheduled over a set of time-frequency resources for communication between the base station and a UE.

The overlap manager 1315 may determine that time-frequency resources for sidelink communications at least partially overlap the set of time-frequency resources of the message between the base station and the UE.

The preemption transmitter 1320 may transmit, to a group of UEs, a sidelink preemption indication for preemption of sidelink communications based on determining that the time-frequency resources for sidelink communications at least partially overlap the set of time-frequency resources.

In some examples, the preemption transmitter 1320 may transmit a control message that includes the sidelink preemption indication, where a format of the control message is specific to sidelink preemption indications.

In some examples, the preemption transmitter 1320 may transmit the sidelink preemption indication based on a radio network temporary identifier specific to the sidelink preemption indication.

In some examples, the preemption transmitter 1320 may transmit an index corresponding to the set of time-frequency resources within the sidelink preemption indication, where the index corresponds to a serving cell supported by the base station, a resource pool index, or one or more of the group of UEs.

In some examples, the preemption transmitter 1320 may transmit the sidelink preemption indication to a relay UE of the group of UEs for relaying to one or more remote UEs.

In some examples, the preemption transmitter 1320 may transmit an uplink cancellation indication that indicates the sidelink preemption indication using a control format for uplink cancellation indications.

In some examples, the preemption transmitter 1320 may transmit the sidelink preemption indication in accordance with the transmission time.

In some cases, the uplink cancellation indication implicitly indicates the time-frequency resources that at least partially overlap the set of time-frequency resources.

The relay resource manager 1325 may configure a set of resources for relaying the sidelink preemption indication by the relay UE to the one or more remote UEs.

The timing manager 1330 may determine a timing of the sidelink message between the two UEs.

The transmission time manager 1335 may determine a transmission time for the sidelink preemption indication based on the timing of the sidelink message and one or both of a processing time of a relay UE and a processing time of a remote UE.

The configuration manager 1340 may configure the group of UEs for monitoring of the sidelink preemption indication according to a set of monitoring occasions and a set of search space sets separate from an uplink cancellation indication.

Figure 14:
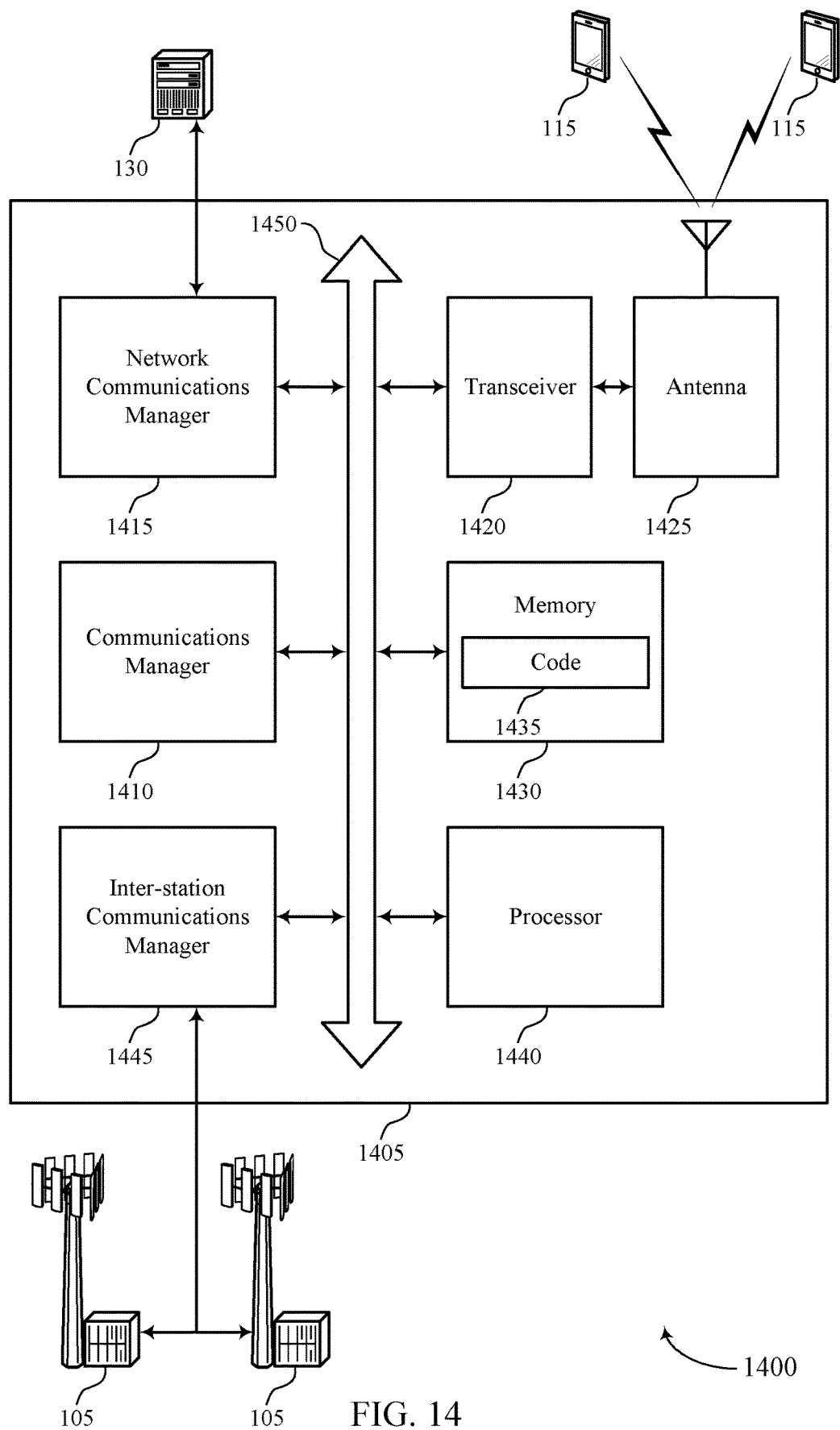
FIG. 14 shows a diagram of a system including a device that supports preemption for sidelink communications in accordance with aspects of the present disclosure.

FIG. 14 shows a diagram of a system 1400 including a device 1405 that supports preemption for sidelink communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may identify a message scheduled over a set of time-frequency resources for communication between the base station and a UE, determine that time-frequency resources for sidelink communications at least partially overlap the set of time-frequency resources of the message between the base station and the UE, and transmit, to a group of UEs, a sidelink preemption indication for preemption of sidelink communications based on determining that the time-frequency resources for sidelink communications at least partially overlap the set of time-frequency resources.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting preemption for sidelink communications).

The inter-station communications manager 1445 may manage communications with other base stations 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
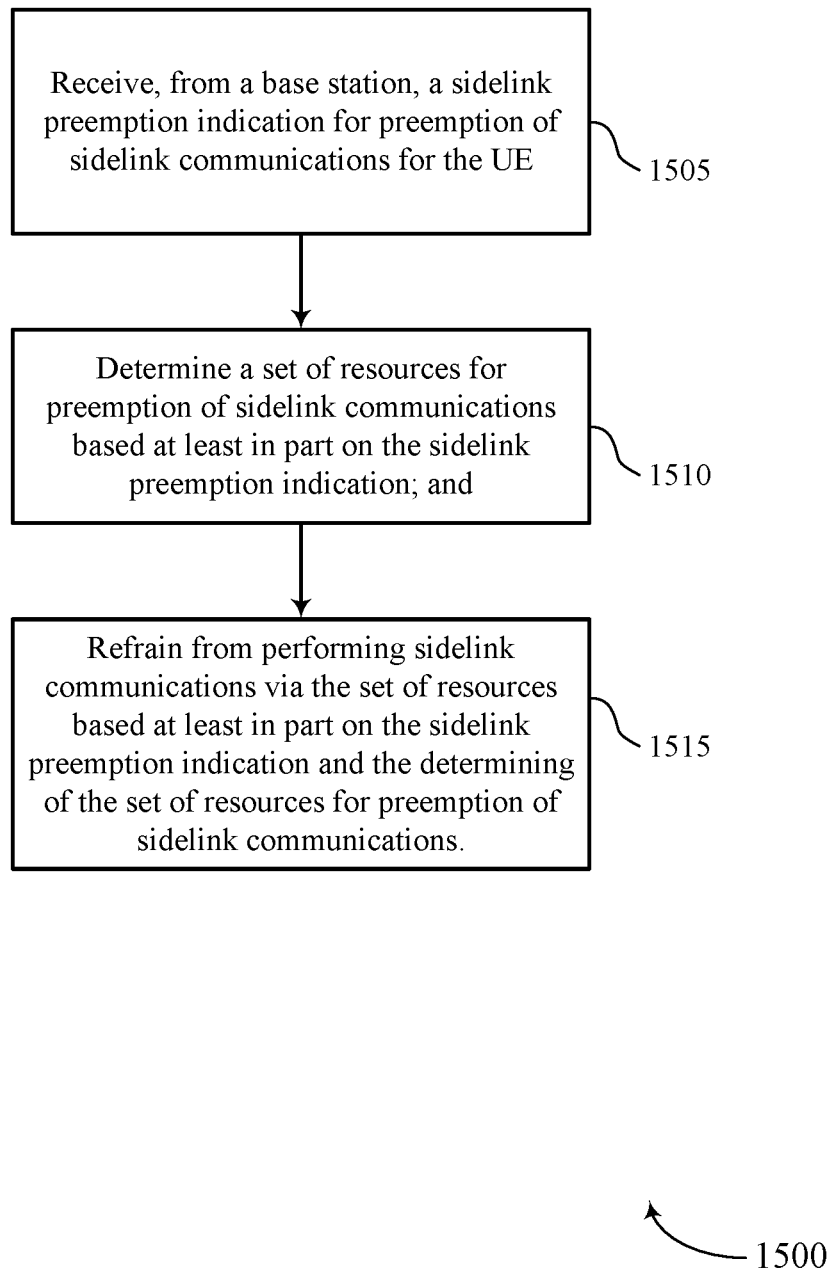
FIGS. 15 through 17 show flowcharts illustrating methods that support preemption for sidelink communications in accordance with aspects of the present disclosure.

FIG. 15 shows a flowchart illustrating a method 1500 that supports preemption for sidelink communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1505, the UE may receive, from a base station, a sidelink preemption indication for preemption of sidelink communications for the UE. The operations of 1505 may be performed according to the methods described herein. In some examples, aspects of the operations of 1505 may be performed by a preemption receiver as described with reference to FIGS. 7 through 10.

At 1510, the UE may determine a set of resources for preemption of sidelink communications based on the sidelink preemption indication. The operations of 1510 may be performed according to the methods described herein. In some examples, aspects of the operations of 1510 may be performed by a delay manager as described with reference to FIGS. 7 through 10.

At 1515, the UE may refrain from performing sidelink communications via the set of resources based at least in part on the sidelink preemption indication and the determining of the set of resources for preemption of sidelink communications. The operations of 1515 may be performed according to the methods described herein. In some examples, aspects of the operations of 1515 may be performed by a preemption transmitter as described with reference to FIGS. 7 through 10.

Figure 16:
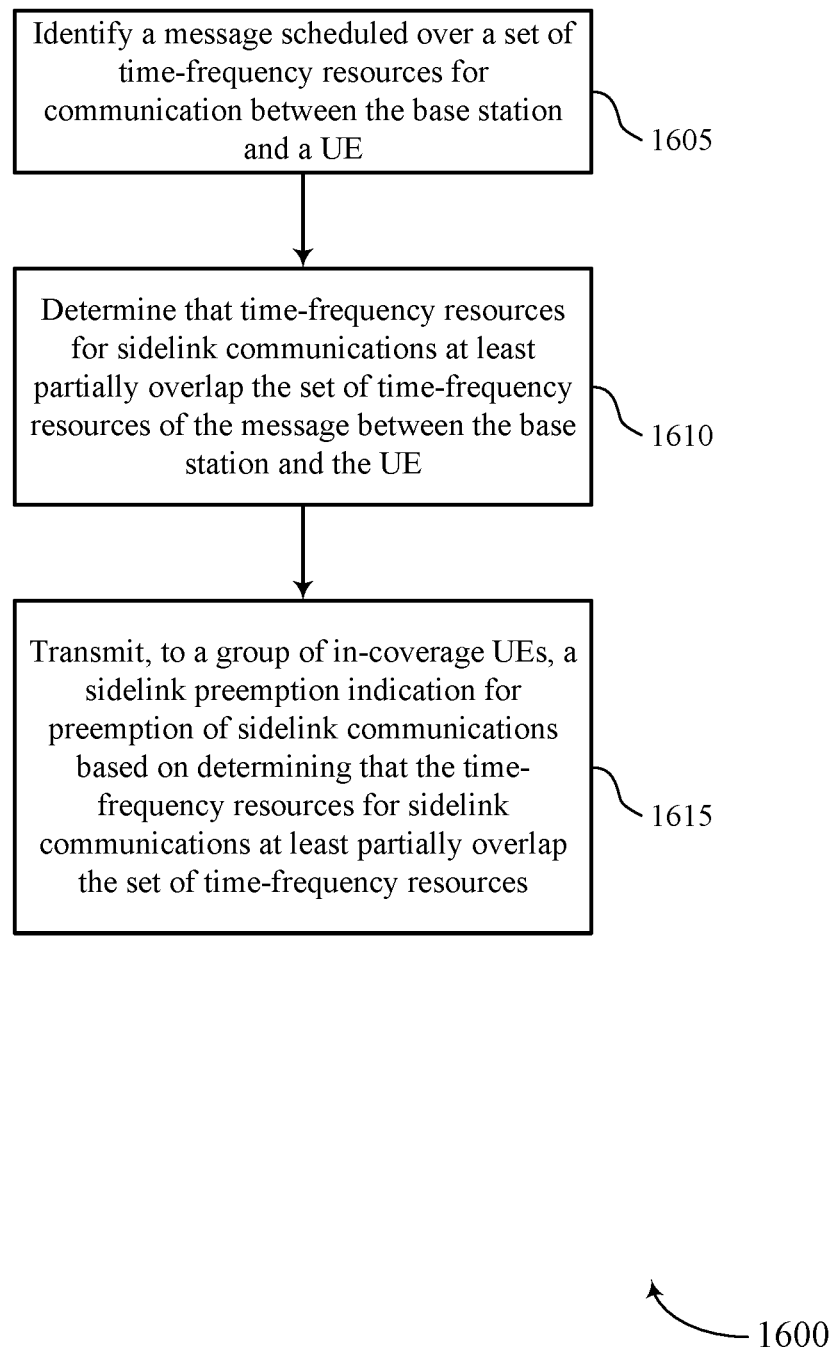

FIG. 16 shows a flowchart illustrating a method 1600 that supports preemption for sidelink communications in accordance with aspects of the present disclosure. The operations of method 1600 may be implemented by a base station 105 or its components as described herein. For example, the operations of method 1600 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1605, the base station may identify a message scheduled over a set of time-frequency resources for communication between the base station and a UE. The operations of 1605 may be performed according to the methods described herein. In some examples, aspects of the operations of 1605 may be performed by a message identifier as described with reference to FIGS. 11 through 14.

At 1610, the base station may determine that time-frequency resources for sidelink communications at least partially overlap the set of time-frequency resources of the message between the base station and the UE. The operations of 1610 may be performed according to the methods described herein. In some examples, aspects of the operations of 1610 may be performed by an overlap manager as described with reference to FIGS. 11 through 14.

At 1615, the base station may transmit, to a group of UEs, a sidelink preemption indication for preemption of sidelink communications based on determining that the time-frequency resources for sidelink communications at least partially overlap the set of time-frequency resources. The operations of 1615 may be performed according to the methods described herein. In some examples, aspects of the operations of 1615 may be performed by a preemption transmitter as described with reference to FIGS. 11 through 14.

Figure 17:
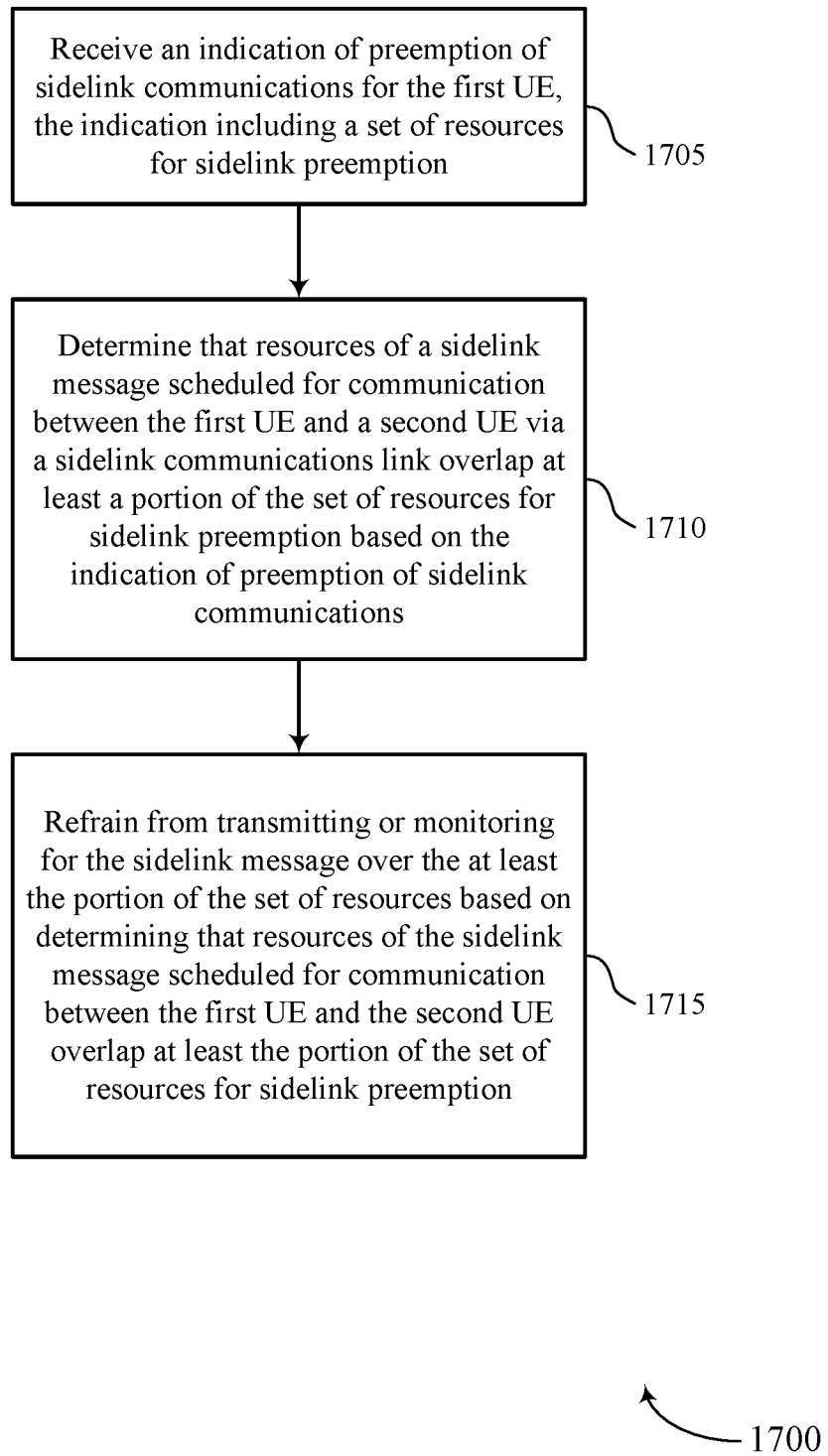

FIG. 17 shows a flowchart illustrating a method 1700 that supports preemption for sidelink communications in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1705, the UE may receive an indication of preemption of sidelink communications for the first UE, the indication including a set of resources for sidelink preemption. The operations of 1705 may be performed according to the methods described herein. In some examples, aspects of the operations of 1705 may be performed by a preemption receiver as described with reference to FIGS. 7 through 10.

At 1710, the UE may determine that resources of a sidelink message scheduled for communication between the first UE and a second UE via a sidelink communications link overlap at least a portion of the set of resources for sidelink preemption based on the indication of preemption of sidelink communications. The operations of 1710 may be performed according to the methods described herein. In some examples, aspects of the operations of 1710 may be performed by a resource manager as described with reference to FIGS. 7 through 10.

At 1715, the UE may refrain from transmitting or monitoring for the sidelink message over the at least the portion of the set of resources based on determining that resources of the sidelink message scheduled for communication between the first UE and the second UE overlap at least the portion of the set of resources for sidelink preemption. The operations of 1715 may be performed according to the methods described herein. In some examples, aspects of the operations of 1715 may be performed by a sidelink manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, from a base station, a sidelink preemption indication for preemption of sidelink communications for the UE; determining a set of resources for preemption of sidelink communications based at least in part on the sidelink preemption indication; and refraining from performing sidelink communications via the set of resources based at least in part on the sidelink preemption indication and the determining of the set of resources for preemption of sidelink communications.

Aspect 2: The method of aspect 1, further comprising: determining that the sidelink preemption indication is for one or more remote UEs in communication with the UE; identifying a delay after receiving the sidelink preemption indication for relaying the sidelink preemption indication to the one or more remote UEs; and transmitting, to the one or more remote UEs, the sidelink preemption indication in accordance with the identified delay; determining the set of resources for preemption of sidelink communications based at least in part on the sidelink preemption indication; determining a transmission timing for relaying the sidelink preemption indication to the one or more remote UEs based at least in part on the delay; and transmitting an indication of a subset of the set of resources in the sidelink preemption indication to the one or more remote UEs based at least in part on the transmission timing.

Aspect 3: The method of aspect 2, further comprising: determining that a second subset of the set of resources for preemption of sidelink communications comprises stale resources based at least in part on the delay, wherein the subset is non-overlapping with the second subset.

Aspect 4: The method of any of aspects 2 through 3, further comprising: padding a set of bits corresponding to the subset of the set of resources based at least in part on a payload size of the preemption indication.

Aspect 5: The method of any of aspects 2 through 4, further comprising: determining an applicability of the sidelink preemption indication for preemption of sidelink communications for the one or more remote UEs based at least in part on the delay, wherein the sidelink preemption indication is transmitted based at least in part on determining the applicability of the sidelink preemption indication.

Aspect 6: The method of any of aspects 2 through 5, wherein identifying the delay comprises: determining a processing time for processing the sidelink preemption indication at the UE; and determining the delay based at least in part on the processing time for processing the sidelink preemption indication at the UE.

Aspect 7: The method of any of aspects 1 through 6, further comprising: determining a generation time associated with generation of the sidelink preemption indication at the base station based at least in part on receiving the sidelink preemption indication; and transmitting an indication of the generation time with the sidelink preemption indication.

Aspect 8: The method of any of aspects 1 through 7, further comprising: determining a generation time associated with generation of the sidelink preemption indication at the base station based at least in part on receiving the sidelink preemption indication; modifying the generation time associated with generation of the sidelink preemption indication based at least in part on a reception time of the sidelink preemption indication at the UE; and transmitting an indication of the modified generation time with the sidelink preemption indication.

Aspect 9: The method of any of aspects 1 through 8, further comprising: transmitting, in the sidelink preemption indication, an indication of a preemption periodicity associated with the sidelink preemption indication.

Aspect 10: The method of any of aspects 1 through 9, wherein transmitting the sidelink preemption indication comprises: determining a set of resources dedicated for transmission of the sidelink preemption indication; and transmitting the sidelink preemption indication via the set of resources.

Aspect 11: The method of aspect 10, further comprising: receiving a configuration from the base station that indicates the set of resources dedicated for transmission of the sidelink preemption indication.

Aspect 12: The method of any of aspects 10 through 11, wherein determining the set of resources comprises: determining a beta value associated with a number of resources allocated for sidelink control information, wherein the sidelink preemption indication is transmitter based at least in part on the beta value.

Aspect 13: The method of aspect 12, further comprising: receiving an indication of the beta value from the base station.

Aspect 14: The method of any of aspects 1 through 13, wherein transmitting the sidelink preemption indication comprises: performing a channel sensing procedure on a set of shared resources based at least in part on receiving the preemption indication; and transmitting the sidelink preemption indication using at least a portion of the set of shared resources based at least in part on a successful channel sensing procedure.

Aspect 15: The method of any of aspects 1 through 14, wherein transmitting the sidelink preemption indication comprises: transmitting a sidelink control message that includes the sidelink preemption indication, wherein a format of the sidelink control message is specific to sidelink preemption indications.

Aspect 16: The method of any of aspects 1 through 15, wherein transmitting the sidelink preemption indication comprises: transmitting a sidelink shared channel that includes the sidelink preemption indication, wherein the sidelink preemption indication is indicated via a medium access control (MAC) control element (MAC-CE) of the sidelink shared channel.

Aspect 17: A method for wireless communications at a base station, comprising: identifying a message scheduled over a set of time-frequency resources for communication between the base station and a UE; determining that time-frequency resources for sidelink communications at least partially overlap the set of time-frequency resources of the message between the base station and the UE; and transmitting, to a group of UEs, a sidelink preemption indication for preemption of sidelink communications based at least in part on determining that the time-frequency resources for sidelink communications at least partially overlap the set of time-frequency resources.

Aspect 18: The method of aspect 17, wherein transmitting theسidelink preemption indication comprises: transmitting a control message that includes the sidelink preemption indication, wherein a format of the control message is specific to sidelink preemption indications.

Aspect 19: The method of any of aspects 17 through 18, wherein transmitting the sidelink preemption indication comprises: transmitting the sidelink preemption indication based at least in part on a radio network temporary identifier specific to the sidelink preemption indication.

Aspect 20: The method of any of aspects 17 through 19, wherein transmitting the sidelink preemption indication comprises: transmitting an index corresponding to the set of time-frequency resources within the sidelink preemption indication, wherein the index corresponds to a serving cell supported by the base station, a resource pool index, or one or more of the group of UEs.

Aspect 21: The method of any of aspects 17 through 20, wherein transmitting the sidelink preemption indication comprises: transmitting the sidelink preemption indication to a relay UE of the group of UEs for relaying to one or more remote UEs.

Aspect 22: The method of aspect 21, further comprising: configuring a set of resources for relaying the sidelink preemption indication by the relay UE to the one or more remote UEs.

Aspect 23: The method of any of aspects 17 through 22, wherein transmitting the sidelink preemption indication comprises: transmitting an uplink cancellation indication that indicates the sidelink preemption indication using a control format for uplink cancellation indications.

Aspect 24: The method of aspect 23, wherein the uplink cancellation indication implicitly indicates the time-frequency resources that at least partially overlap the set of time-frequency resources.

Aspect 25: The method of any of aspects 17 through 24, further comprising: determining a timing of the sidelink message between two UEs of the group of UEs; determining a transmission time for the sidelink preemption indication based at least in part on the timing of the sidelink message and one or both of a processing time of a relay UE and a processing time of a remote UE; and transmitting the sidelink preemption indication in accordance with the transmission time.

Aspect 26: The method of any of aspects 17 through 25, further comprising: configuring the group of UEs for monitoring of the sidelink preemption indication according to a set of monitoring occasions and a set of search space sets separate from an uplink cancellation indication.

Aspect 27: A method for wireless communications at a first UE, comprising: receiving an indication of preemption of sidelink communications for the first UE, the indication comprising a set of resources for sidelink preemption; determining that resources of a sidelink message scheduled for communication between the first UE and a second UE via a sidelink communications link overlap at least a portion of the set of resources for sidelink preemption based at least in part on the indication of preemption of sidelink communications; and refraining from transmitting or monitoring for the sidelink message over the at least the portion of the set of resources based at least in part on determining that resources of the sidelink message scheduled for communication between the first UE and the second UE overlap at least the portion of the set of resources for sidelink preemption.

Aspect 28: The method of aspect 27, wherein receiving the indication of preemption of sidelink communications comprises: receiving an uplink cancellation indication for cancellation of an uplink message by the first UE, wherein the uplink message is scheduled via the at least the portion of the set of resources; and refraining from transmitting a sidelink message over the at least the portion of the set of resources based at least in part on the uplink cancellation indication.

Aspect 29: The method of aspect 28, further comprising: refraining from transmitting the sidelink message based at least in part on a priority of the sidelink message being below a priority level indicated by the uplink cancellation indication; and transmitting a second sidelink message based at least in part on a priority of the second sidelink message being above the priority level indicated by the uplink cancellation indication.

Aspect 30: The method of aspect 29, wherein the priority level is configured for the first UE, a given resource pool, a given carrier, a given transmission type, a given zone identifier, a given reference signal received power (RSRP), or any combination thereof.

Aspect 31: The method of any of aspects 27 through 30, wherein receiving the indication of preemption of sidelink communications comprises: receiving a sidelink preemption indication for preemption of sidelink communications for the first UE.

Aspect 32: The method of aspect 31, further comprising: identifying a generation time of the sidelink preemption indication based at least in part on the sidelink preemption indication; and refraining from transmitting or monitoring for the sidelink message over the at least the portion of the set of resources based at least in part on the generation time.

Aspect 33: The method of any of aspects 27 through 32, wherein receiving the indication of preemption of sidelink communications comprises: monitoring resources dedicated for sidelink preemption indications; and receiving a sidelink preemption indication based at least in part on the monitoring.

Aspect 34: The method of any of aspects 27 through 33, further comprising: determining that a priority level of the sidelink message is lower than a priority level of the indication of preemption of sidelink communications; and refraining from transmitting or monitoring for the sidelink message based at least in part on determining that the priority level of the sidelink message is lower than the priority level of the indication of preemption of sidelink communications.

Aspect 35: The method of any of aspects 27 through 34, wherein receiving the indication of preemption of sidelink communications comprises: receiving a sidelink preemption indication from a base station or a relay UE in communication with the first UE.

Aspect 36: An apparatus for wireless communications at a UE, comprising a processor; memory coupled with the processor; and instructions stored in the memory and executable by the processor to cause the apparatus to perform a method of any of aspects 1 through 16.

Aspect 37: An apparatus for wireless communications at a UE, comprising at least one means for performing a method of any of aspects 1 through 16.

Aspect 38: A non-transitory computer-readable medium storing code for wireless communications at a UE, the code comprising instructions executable by a processor to perform a method of any of aspects 1 through 16.

Aspect 39: An apparatus for wireless communications at a base station, comprising a processor; memory coupled with the processor; and instructions stored in the memory and executable by the processor to cause the apparatus to perform a method of any of aspects 17 through 26.

Aspect 40: An apparatus for wireless communications at a base station, comprising at least one means for performing a method of any of aspects 17 through 26.

Aspect 41: A non-transitory computer-readable medium storing code for wireless communications at a base station, the code comprising instructions executable by a processor to perform a method of any of aspects 17 through 26.

Aspect 42: An apparatus for wireless communications at a first UE, comprising a processor; memory coupled with the processor; and instructions stored in the memory and executable by the processor to cause the apparatus to perform a method of any of aspects 27 through 35.

Aspect 43: An apparatus for wireless communications at a first UE, comprising at least one means for performing a method of any of aspects 27 through 35.

Aspect 44: A non-transitory computer-readable medium storing code for wireless communications at a first UE, the code comprising instructions executable by a processor to perform a method of any of aspects 27 through 35.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein

What is claimed is:

1. A method for wireless communications at a user equipment (UE), comprising:
    receiving, from a network device, a first sidelink preemption indication for preemption of sidelink communications for the UE and one or more remote UEs in communication with the UE, the first sidelink preemption indication comprising an indication of a set of one or more resources for preemption of sidelink communications;
    transmitting, to the one or more remote UEs and based at least in part on the first sidelink preemption indication, a second sidelink preemption indication indicating at least a first subset of the set of one or more resources; and
    refraining from performing sidelink communications via at least the first subset of the set of one or more resources based at least in part on the second sidelink preemption indication.

2. The method of claim 1, wherein transmitting the second sidelink preemption indication comprises:
    transmitting the second sidelink preemption indication according to a transmission timing that is based at least in part on an identification of a delay after receiving the first sidelink preemption indication.

3. The method of claim 2, wherein the second sidelink preemption indication comprises an indication that a second subset of the set of one or more resources comprises stale resources based at least in part on the delay, wherein the first subset is non-overlapping with the second subset.

4. The method of claim 1, further comprising:
    padding a set of bits corresponding to the first subset of the set of one or more resources based at least in part on a payload size of the first sidelink preemption indication.

5. The method of claim 1, wherein transmitting the second sidelink preemption indication comprises:
    transmitting the second sidelink preemption indication based at least in part on an applicability of the first sidelink preemption indication for the preemption of sidelink communications for the one or more remote UEs.

6. The method of claim 2, wherein the delay after receiving the first sidelink preemption indication is based at least in part on a processing time for processing the first sidelink preemption indication at the UE.

7. The method of claim 1, further comprising:
transmitting an indication of a generation time associated with generation of the first sidelink preemption indication at the network device.

8. The method of claim 1, further comprising:
transmitting an indication of a modified generation time with the second sidelink preemption indication, the modified generation time based at least in part on a reception time of the first sidelink preemption indication at the UE and a generation time associated with generation of the first sidelink preemption indication at the network device.

9. The method of claim 1, further comprising:
transmitting, in the second sidelink preemption indication, an indication of a preemption periodicity associated with the second sidelink preemption indication.

10. The method of claim 2, wherein transmitting the second sidelink preemption indication comprises:
transmitting the second sidelink preemption indication via a second set of one or more resources dedicated for transmission of the second sidelink preemption indication.

11. The method of claim 10, further comprising:
receiving, from the network device, a configuration that indicates the second set of one or more resources that are dedicated for transmission of the second sidelink preemption indication.

12. The method of claim 1, wherein transmitting the second sidelink preemption indication comprises:
performing a channel sensing procedure on a set of one or more shared resources based at least in part on receiving the first sidelink preemption indication; and
transmitting the second sidelink preemption indication using at least a portion of the set of one or more shared resources based at least in part on the channel sensing procedure being successful.

13. The method of claim 1, wherein transmitting the second sidelink preemption indication comprises:
transmitting a sidelink control message that includes the second sidelink preemption indication, wherein a format of the sidelink control message is specific to sidelink preemption indications.

14. The method of claim 1, wherein transmitting the second sidelink preemption indication comprises:
transmitting a sidelink shared channel that includes the second sidelink preemption indication, wherein the second sidelink preemption indication is indicated via a medium access control (MAC) control element (MAC-CE) of the sidelink shared channel.

15. A method for wireless communications at a first user equipment (UE), comprising:
receiving a sidelink preemption indication for preemption of sidelink communications for the first UE, the sidelink preemption indication comprising an indication of at least a first subset of a first set of one or more resources for sidelink preemption and a generation time associated with generation of the sidelink preemption indication; and
refraining from performing sidelink communication of a sidelink message scheduled for communication between the first UE and a second UE over at least the first subset of the first set of one or more resources based at least in part on an overlap of the one or more resources of the sidelink message and one or more resources of the first subset of the first set of one or more resources for sidelink preemption and the generation time.

16. The method of claim 15, wherein receiving the sidelink preemption indication comprises:
receiving an uplink cancellation indication for cancellation of an uplink message by the first UE, wherein the uplink message is scheduled for at least the first subset of the first set of one or more resources; and
refraining from transmitting the sidelink message over at least the first subset of the first set of one or more resources based at least in part on the uplink cancellation indication.

17. The method of claim 16, further comprising:
refraining from transmitting the sidelink message based at least in part on a first priority of the sidelink message being below a second priority level indicated by the uplink cancellation indication; and
transmitting a second sidelink message based at least in part on a third priority of the second sidelink message being above the second priority level indicated by the uplink cancellation indication.

18. The method of claim 17, wherein the first priority level, the second priority level, or both, is configured for the first UE, configured for a resource pool, configured for a carrier, configured for a transmission type, configured for a zone identifier, configured for a reference signal received power (RSRP), or any combination thereof.

19. The method of claim 15, wherein receiving the sidelink preemption indication comprises:
receiving the sidelink preemption indication via a second set of one or more resources dedicated for sidelink preemption indications.

20. The method of claim 15, further comprising:
refraining from performing sidelink communication of the sidelink message based at least in part on a determination that a first priority level of the sidelink message is lower than a second priority level indicated by the sidelink preemption indication.

21. The method of claim 15, wherein receiving the sidelink preemption indication comprises:
receiving the sidelink preemption indication from a network device or a relay UE in communication with the first UE.

22. A user equipment (UE) for wireless communication, comprising:
one or more memories storing processor-executable code; and
one or more processors coupled with the one or more memories and individually or collectively operable to execute the code to cause the UE to:
receive, from a network device, a first sidelink preemption indication for preemption of sidelink communications for the UE and one or more remote UEs in communication with the UE, the first sidelink preemption indication comprising an indication of a set of one or more resources for the preemption of sidelink communications;
transmit, to the one or more remote UEs and based at least in part on the first sidelink preemption indication, a second sidelink preemption indication indicating at least a first subset of the set of one or more resources; and refrain from performing sidelink communications via at least the first subset of the set of one or more resources based at least in part on the second sidelink preemption indication.

23. The UE of claim 22, wherein, to transmit the second sidelink preemption indication, the one or more processors are individually or collectively operable to execute the code to cause the UE to:
transmit the second sidelink preemption indication according to a transmission timing that is based at least in part on an identification of a delay after receiving the first sidelink preemption indication.

24. The UE of claim 22, wherein the one or more processors are individually or collectively operable to execute the code to cause the UE to:
transmit an indication of a generation time associated with generation of the first sidelink preemption indication at the network device.

25. A user equipment (UE) for wireless communication, comprising:
one or more memories storing processor-executable code; and
one or more processors coupled with the one or more memories and individually or collectively operable to execute the code to cause the UE to:
receive a sidelink preemption indication for preemption of sidelink communications for the first UE, the sidelink preemption indication comprising an indication of at least a first subset of a first set of one or more resources for sidelink preemption and a generation time associated with generation of the sidelink preemption indication; and
refrain from performing sidelink communications of a sidelink message scheduled for communication between the first UE and a second UE over at least the first subset of the first set of one or more resources based at least in part on an overlap of the one or more resources of the sidelink message and one or more resources of the first subset of the first set of one or more resources for sidelink preemption and the generation time.

26. The UE of claim 25, wherein, to receive the sidelink preemption indication, the one or more processors are individually or collectively operable to execute the code to cause the UE to:
receive an uplink cancellation indication for cancellation of an uplink message by the first UE, wherein the uplink message is scheduled for at least the first subset of the first set of one or more resources; and
refrain from transmitting the sidelink message over at least the first subset of the first set of one or more resources based at least in part on the uplink cancellation indication.

27. The UE of claim 26, wherein the one or more processors are individually or collectively operable to execute the code to cause the UE to:
refrain from transmitting the sidelink message based at least in part on a first priority of the sidelink message being below a second priority level indicated by the uplink cancellation indication; and
transmit a second sidelink message based at least in part on a third priority of the second sidelink message being above the second priority level indicated by the uplink cancellation indication.

28. The UE of claim 27, wherein the first priority level, the second priority level, or both, is configured for the first UE, configured for a resource pool, configured for a carrier, configured for a transmission type, configured for a zone identifier, configured for a reference signal received power (RSRP), or any combination thereof.

29. The UE of claim 25, wherein, to receive the sidelink preemption indication, the one or more processors are individually or collectively operable to execute the code to cause the UE to:
receive the sidelink preemption indication via a second set of one or more resources dedicated for sidelink preemption indications.

30. The UE of claim 25, wherein the one or more processors are individually or collectively operable to execute the code to cause the UE to:
refrain from performing sidelink communication of the sidelink message based at least in part on a determination that a first priority level of the sidelink message is lower than a second priority level indicated by the sidelink preemption indication.

* * * * *